US011729506B2

(12) United States Patent
Sugawara et al.

(10) Patent No.: US 11,729,506 B2
(45) Date of Patent: Aug. 15, 2023

(54) IMAGING ELEMENT WITH PROCESSOR CONFIGURED TO RECEIVE VIBRATION INFORMATION, IMAGING APPARATUS, OPERATION METHOD OF IMAGING ELEMENT, AND PROGRAM

(71) Applicant: FUJIFILM CORPORATION, Tokyo (JP)

(72) Inventors: Kazufumi Sugawara, Saitama (JP); Makoto Kobayashi, Saitama (JP); Tomoyuki Kawai, Saitama (JP); Hitoshi Sakurabu, Saitama (JP); Ryo Hasegawa, Saitama (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 17/807,860

(22) Filed: Jun. 20, 2022

(65) Prior Publication Data
US 2022/0321784 A1 Oct. 6, 2022

Related U.S. Application Data

(63) Continuation of application No. PCT/JP2020/043218, filed on Nov. 19, 2020.

(30) Foreign Application Priority Data

Jan. 31, 2020 (JP) ................. 2020-015751

(51) Int. Cl.
H04N 23/68 (2023.01)
(52) U.S. Cl.
CPC ....... H04N 23/683 (2023.01); H04N 23/6812 (2023.01)

(58) Field of Classification Search
None
See application file for complete search history.

(56) References Cited

U.S. PATENT DOCUMENTS

2006/0262193 A1 11/2006 Kumaki
2015/0181148 A1* 6/2015 Slovick .................. H04N 5/378
348/222.1
(Continued)

FOREIGN PATENT DOCUMENTS

JP 2006-319912 A 11/2006
JP 2012-124614 A 6/2012
(Continued)

OTHER PUBLICATIONS

International Search Report issued in International Application No. PCT/JP2020/043218 dated Feb. 9, 2021.
(Continued)

Primary Examiner — Cynthia Segura
(74) Attorney, Agent, or Firm — Solaris Intellectual Property Group, PLLC

(57) ABSTRACT

An imaging element includes a memory that stores first image data obtained by being captured by the imaging element and is incorporated in the imaging element, and a first processor that is configured to perform image data processing on the first image data and is incorporated in the imaging element. The first processor is configured to receive vibration information related to a vibration exerted on the imaging element within a frame output period defined by a first frame rate, and output second image data obtained by assigning the vibration information to a specific position set in the first image data within the frame output period.

19 Claims, 30 Drawing Sheets

(56) References Cited

U.S. PATENT DOCUMENTS

| | | | | |
|---|---|---|---|---|
| 2017/0155865 A1* | 6/2017 | Nakajima | .......... | H01L 27/14643 |
| 2019/0281221 A1* | 9/2019 | Kuwahara | .......... | H04N 5/23258 |
| 2021/0037186 A1* | 2/2021 | Kuwahara | .......... | H04N 5/23258 |

FOREIGN PATENT DOCUMENTS

| | | | |
|---|---|---|---|
| JP | 2016-208483 A | 12/2016 |
| JP | 2018-011098 A | 1/2018 |
| WO | 2019/151030 A1 | 8/2019 |

OTHER PUBLICATIONS

Written Opinion of the ISA issued in International Application No. PCT/JP2020/043218 dated Feb. 9, 2021.

\* cited by examiner

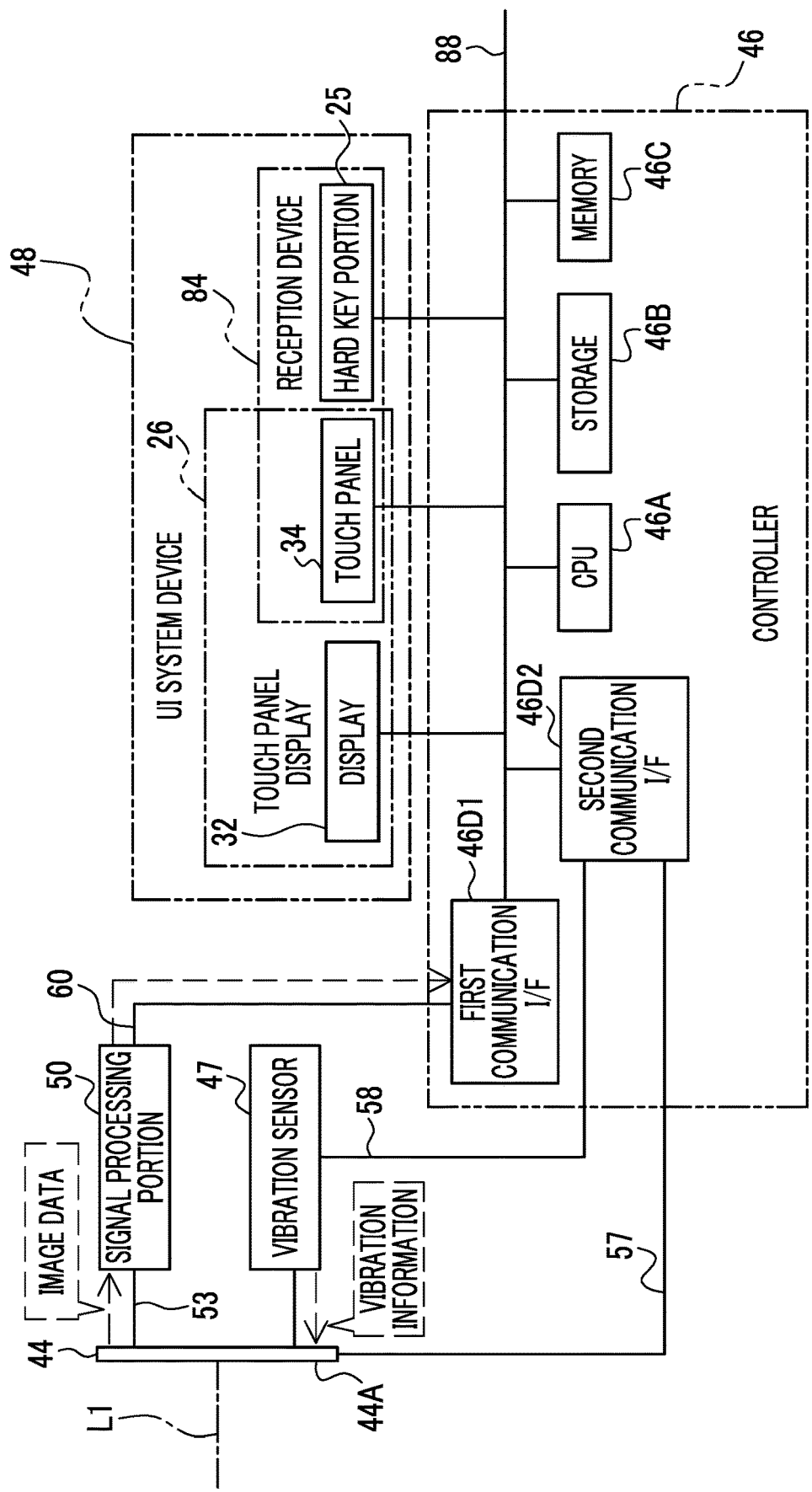

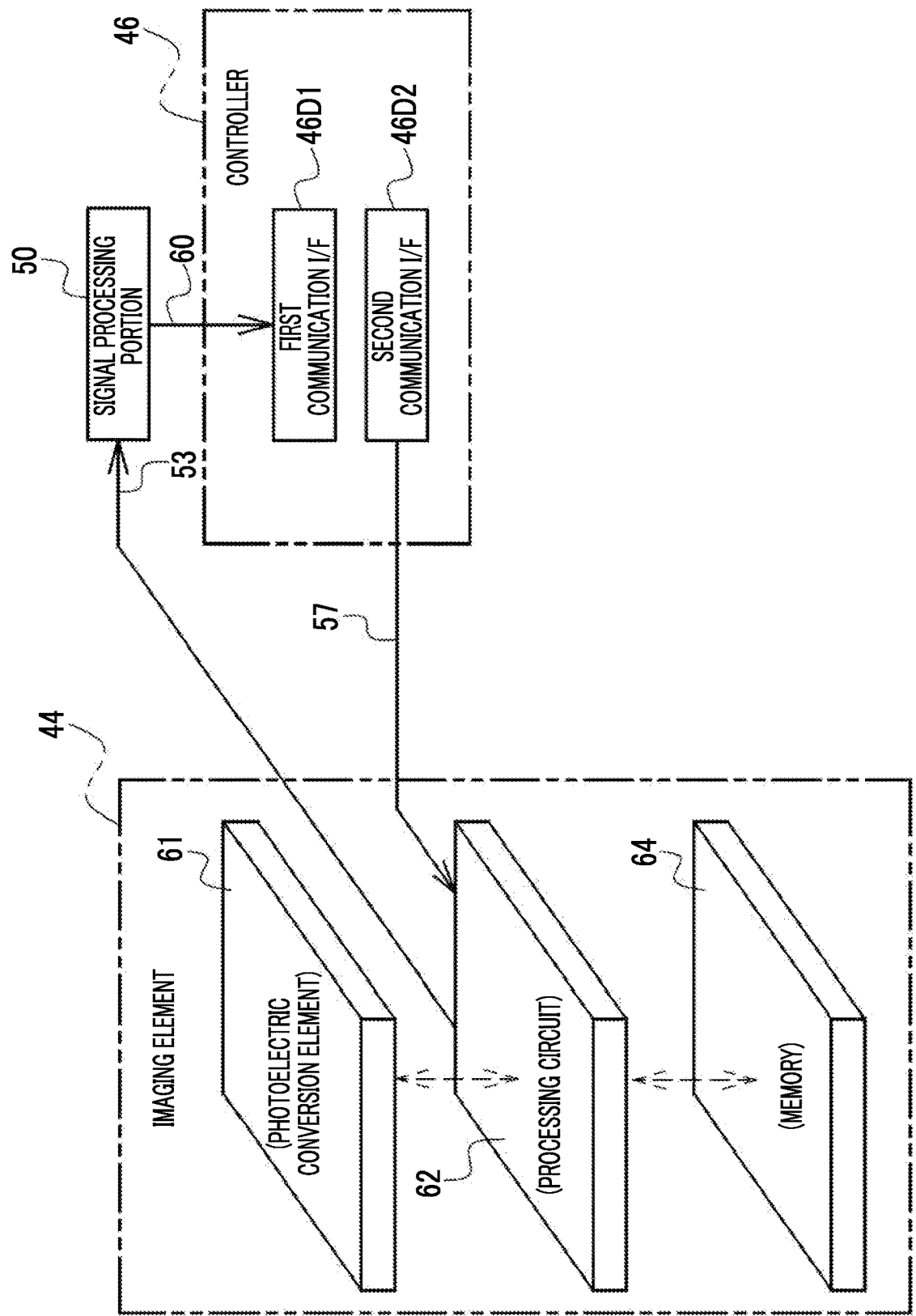

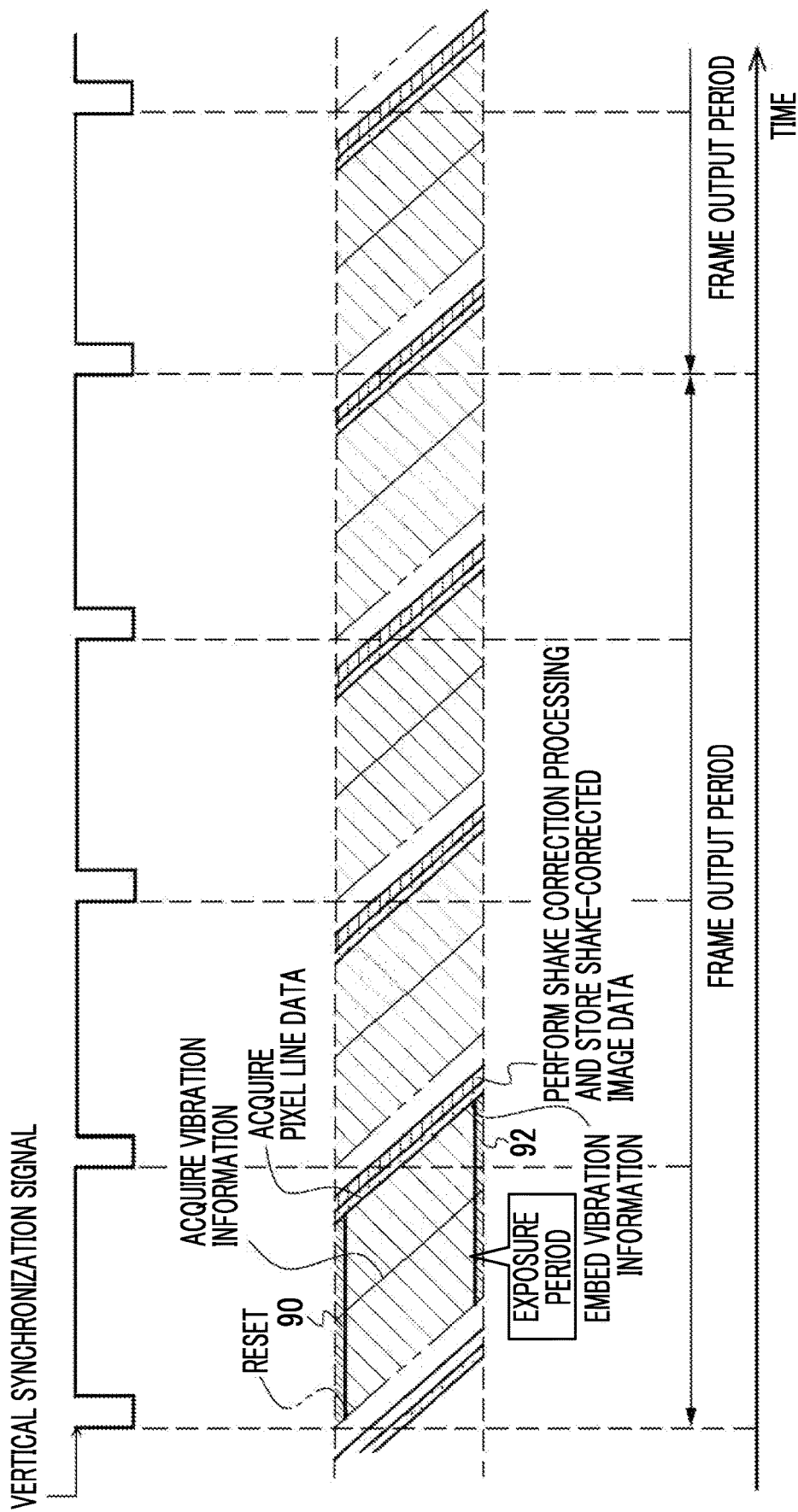

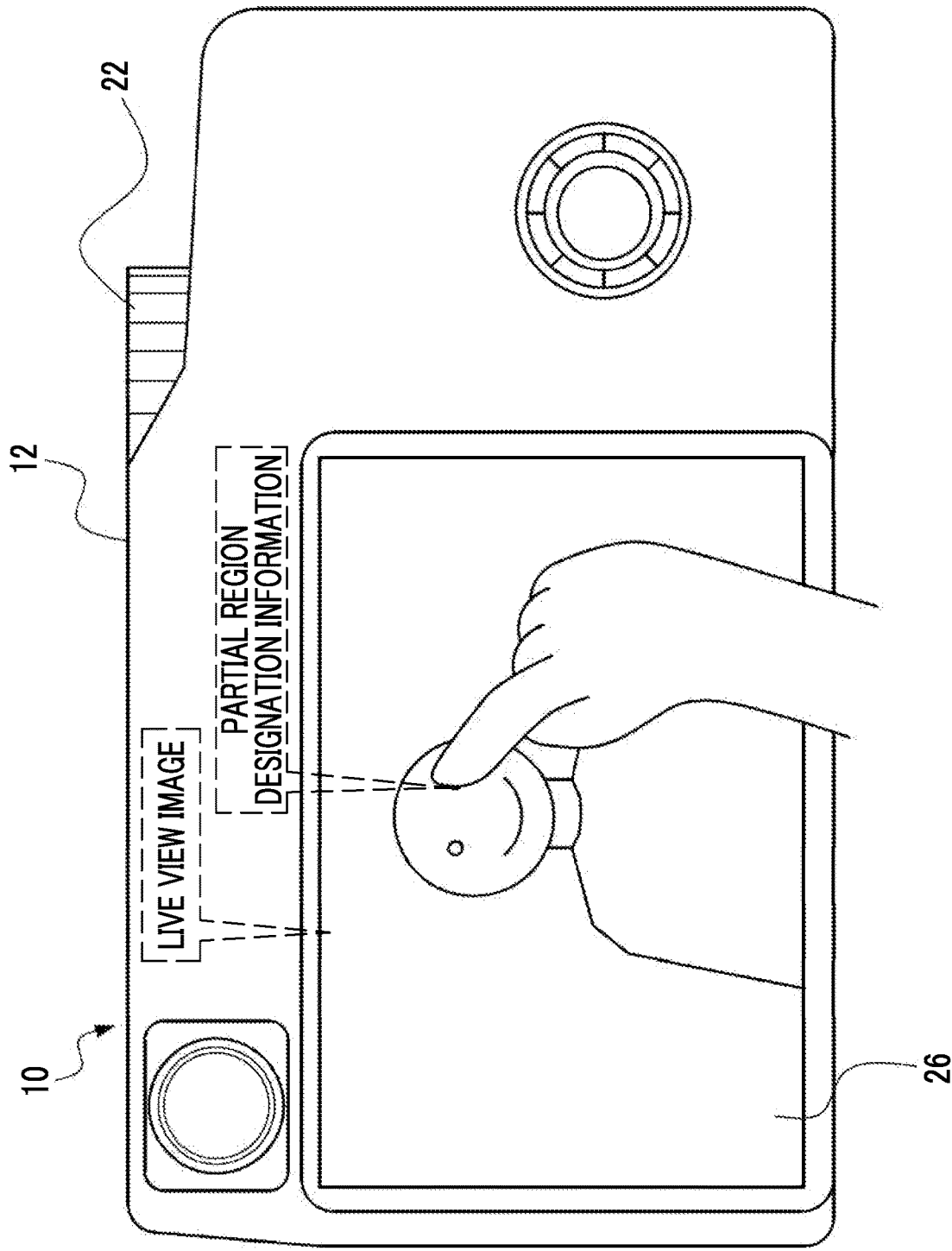

IMAGING ELEMENT WITH PROCESSOR CONFIGURED TO RECEIVE VIBRATION INFORMATION, IMAGING APPARATUS, OPERATION METHOD OF IMAGING ELEMENT, AND PROGRAM

CROSS-REFERENCE TO RELATED APPLICATIONS

This application is a continuation application of International Application No. PCT/JP2020/043218, filed on Nov. 19, 2020, the disclosure of which is incorporated herein by reference in its entirety. Further, this application claims priority from Japanese Patent Application No. 2020-015751, filed on Jan. 31, 2020, the disclosure of which is incorporated herein by reference in its entirety.

BACKGROUND

1. Technical Field

The technology of the present disclosure relates to an imaging element, an imaging apparatus, an operation method of an imaging element, and a program.

2. Related Art

JP2018-011098A discloses a video processing apparatus that performs processing of recording video data generated by being captured and shake information related to a shake during the imaging and includes an assignment unit that assigns playback validity information indicating playback availability and playback invalidity information indicating playback unavailability to the video data as playback identification information indicating whether or not the video data can be played back, and a processing unit that generates and records recording data including the video data, the shake information, and the playback identification information, in which the processing unit generates first data including the video data in a first period before the start of the recording, the shake information, and the playback invalidity information in accordance with recording start vibration information, generates second data including the video data in a second period from the start of the recording to the finish of the recording corresponding to a recording finish instruction, the shake information, and the playback validity information, generates third data including the video data in a third period after the finish of the recording, the shake information, and the playback invalidity information, and generates the recording data in which the first, second, and third data are combined.

JP2012-124614A discloses an imaging apparatus that generates motion picture image data by imaging a subject and records the motion picture image data on a recording medium and comprises an apparatus operation recording unit that records operation information of the imaging apparatus at a time of recording a motion picture image, a camerawork determination unit that determines a camerawork type corresponding to the operation information, a frame range specification unit that specifies a frame range within which the camerawork type is determined from the motion picture image data, a camerawork management unit that records the camerawork type and the frame range in association with each other as camerawork information, an expression target camerawork specification unit that specifies a camerawork type representing a motion picture image from the camerawork information in accordance with a predetermined method, and a camerawork expression information creation unit that creates information for expressing the camerawork type specified by the expression target camerawork specification unit when representative images of the motion picture images are displayed in a list.

JP2016-208483A discloses a video system and an aerial imaging system using the video system. The video system includes a Gyro sensor, a holding unit that holds a Gyro value from the Gyro sensor, an order detection unit for receiving a horizontal synchronization signal from an image sensor and obtaining an order H number in a frame of the synchronization signal, and a synchronization and holding unit consisting of a pairing and holding unit that pairs and holds at least one set of a pair of the order H number and the Gyro value, in which a blur position of an image is specified using the image from the image sensor, a camera parameter of the image sensor, and blur angle information from the Gyro value, and a blur of a video is corrected to obtain a high-quality video by restoring video data at the position to an original position.

SUMMARY

An embodiment according to the technology of the present disclosure provides an imaging element, an imaging apparatus, an operation method of an imaging element, and a program that can output second image data to which vibration information synchronized with first image data obtained by being captured by the imaging element is assigned.

A first aspect according to the technology of the present disclosure is an imaging element comprising a memory that stores first image data obtained by being captured by the imaging element and is incorporated in the imaging element, and a first processor that is configured to perform image data processing on the first image data and is incorporated in the imaging element, in which the first processor is configured to receive vibration information related to a vibration exerted on the imaging element within a frame output period defined by a first frame rate, and output second image data obtained by assigning the vibration information to a specific position set in the first image data within the frame output period.

A second aspect according to the technology of the present disclosure is the imaging element according to the first aspect, in which the first image data is pixel line data composed of a plurality of lines, and the specific position is a position set in the pixel line data of at least one line.

A third aspect according to the technology of the present disclosure is the imaging element according to the second aspect, in which the specific position is a position set in the pixel line data of each of the plurality of lines.

A fourth aspect according to the technology of the present disclosure is the imaging element according to the second aspect, in which the first processor is configured to receive partial region designation information for designating a partial region of the first image data, and receive the vibration information within an exposure period of a pixel line corresponding to the partial region among a plurality of pixel lines included in the imaging element, and the specific position is a position set in the pixel line data corresponding to the partial region.

A fifth aspect according to the technology of the present disclosure is the imaging element according to the second aspect, in which the first processor is configured to receive the vibration information within an exposure period of a center pixel line positioned at a center of the imaging element among a plurality of pixel lines included in the imaging element, and the specific position is a position set in the pixel line data corresponding to the center pixel line.

A sixth aspect according to the technology of the present disclosure is the imaging element according to the fourth or fifth aspect, in which the specific position is a position set in the pixel line data for a pixel line that is exposed within a period closest to a period in which the vibration information is acquired among the plurality of pixel lines included in the imaging element.

A seventh aspect according to the technology of the present disclosure is the imaging element according to any one of the second to sixth aspects, in which the specific position is a head or a tail of the pixel line data.

An eighth aspect according to the technology of the present disclosure is the imaging element according to any one of the first to seventh aspects, in which the first processor is configured to decide whether or not to assign the vibration information to the first image data in accordance with a value of the vibration information.

A ninth aspect according to the technology of the present disclosure is the imaging element according to the eighth aspect, in which the first processor is configured to, in a case where the vibration information exceeds a threshold value, assign the vibration information to the first image data.

A tenth aspect according to the technology of the present disclosure is the imaging element according to any one of the first to ninth aspects, in which the vibration information is at least one of an angular velocity, an acceleration, an integrated value of an angle, an integrated value of an acceleration, or a shake correction amount.

An eleventh aspect according to the technology of the present disclosure is the imaging element according to any one of the first to tenth aspects, in which the imaging element is an imaging element in which at least a photoelectric conversion element and the memory are formed in one chip.

A twelfth aspect according to the technology of the present disclosure is the imaging element according to the eleventh aspect, in which the imaging element is a laminated imaging element in which the photoelectric conversion element and the memory are laminated.

A thirteenth aspect according to the technology of the present disclosure is the imaging element according to any one of the first to twelfth aspects, in which the first processor is configured to perform shake correction processing on the second image data based on the vibration information assigned to the second image data within the frame output period.

A fourteenth aspect according to the technology of the present disclosure is the imaging element according to the thirteenth aspect, in which the first processor is configured to perform the shake correction processing using an average value, a median value, or a mode value of the vibration information.

A fifteenth aspect according to the technology of the present disclosure is the imaging element according to any one of the first to fourteenth aspects, in which the first processor is configured to perform the image data processing on the first image data captured at a second frame rate higher than the first frame rate, and the image data processing includes acquisition processing of acquiring the first image data, reception processing of receiving the vibration information, generation processing of generating the second image data by assigning the vibration information to the first image data, and shake correction processing of correcting a shake with respect to the second image data based on the vibration information assigned to the second image data.

A sixteenth aspect according to the technology of the present disclosure is the imaging element according to the fifteenth aspect, in which the first processor is configured to generate and output third image data of one frame by combining the second image data of a plurality of frames after the shake correction processing within the frame output period.

A seventeenth aspect according to the technology of the present disclosure is an imaging apparatus comprising the imaging element according to any one of the first to sixteenth aspects, and a second processor that is disposed on a rear stage of the imaging element and is configured to receive an input of the second image data from the imaging element, in which the second image data includes pixel line data of a plurality of lines, the vibration information is assigned to the pixel line data of each of the plurality of lines, and the second processor is configured to acquire specific subject positional information indicating a position of a specific subject based on the second image data, and perform shake correction processing on the second image data based on the vibration information assigned to the pixel line data corresponding to the specific subject positional information in the pixel line data of the plurality of lines.

An eighteenth aspect according to the technology of the present disclosure is an operation method of an imaging element including a memory that stores first image data obtained by being captured by the imaging element and is incorporated in the imaging element, and a processor that is configured to process the first image data and is incorporated in the imaging element, the operation method comprising receiving vibration information related to a vibration exerted on the imaging element within a frame output period defined by a first frame rate, and outputting second image data obtained by assigning the vibration information to the first image data within the frame output period.

A nineteenth aspect according to the technology of the present disclosure is a program causing a computer to execute a process, the computer being applied to an imaging element including a memory that stores first image data obtained by being captured by the imaging element and is incorporated in the imaging element, and a processor that is configured to process the first image data and is incorporated in the imaging element, the process comprising receiving vibration information related to a vibration exerted on the imaging element within a frame output period defined by a first frame rate, and outputting second image data obtained by assigning the vibration information to the first image data within the frame output period.

BRIEF DESCRIPTION OF THE DRAWINGS

Exemplary embodiments of the technology of the disclosure will be described in detail based on the following figures, wherein:

FIG. 4 is a block diagram illustrating an example of an electric configuration of an imaging apparatus main body according to the first embodiment;

FIG. 5 is a block diagram illustrating an example of a laminated structure of the imaging element included in the imaging apparatus according to the first to fifth embodiments, and an example of a connection relationship among the imaging element, a signal processing portion, and a controller;

FIG. 9 is a time chart illustrating an example of an exposure period in the imaging element included in the imaging apparatus according to the first embodiment, a vibration information acquisition timing, a pixel line data acquisition timing, a vibration information embedding timing, a shake correction processing timing, and a shake-corrected image data storage timing;

FIG. 11 is a conceptual diagram for describing partial region designation information input by a user in the imaging apparatus according to the second embodiment;

DETAILED DESCRIPTION

Hereinafter, an example of embodiments of an imaging apparatus according to the embodiments of the technology of the present disclosure will be described in accordance with the appended drawings.

First, meanings of terms used in the following description will be described.

The abbreviation CPU stands for "Central Processing Unit". The abbreviation RAM stands for "Random Access Memory". The abbreviation ROM stands for "Read Only Memory". The abbreviation DRAM stands for "Dynamic Random Access Memory". The abbreviation SRAM stands for "Static Random Access Memory".

The abbreviation LSI stands for "Large-Scale Integrated Circuit". The abbreviation IC stands for "Integrated Circuit". The abbreviation ASIC stands for "Application Specific Integrated Circuit". The abbreviation PLD stands for "Programmable Logic Device". The abbreviation FPGA stands for "Field-Programmable Gate Array".

The abbreviation SSD stands for "Solid State Drive". The abbreviation USB stands for "Universal Serial Bus".

The abbreviation CCD stands for "Charge Coupled Device". The abbreviation CMOS stands for "Complementary Metal Oxide Semiconductor". The abbreviation EL stands for "Electro-Luminescence". The abbreviation A/D stands for "Analog/Digital". The abbreviation I/F stands for "Interface". The abbreviation UI stands for "User Interface". The abbreviation AF stands for "Auto-Focus". The abbreviation AE stands for "Automatic Exposure". The abbreviation SoC stands for "System-on-a-chip". The abbreviation OIS stands for "Optical Image Stabilizer".

First Embodiment

Figure 1:
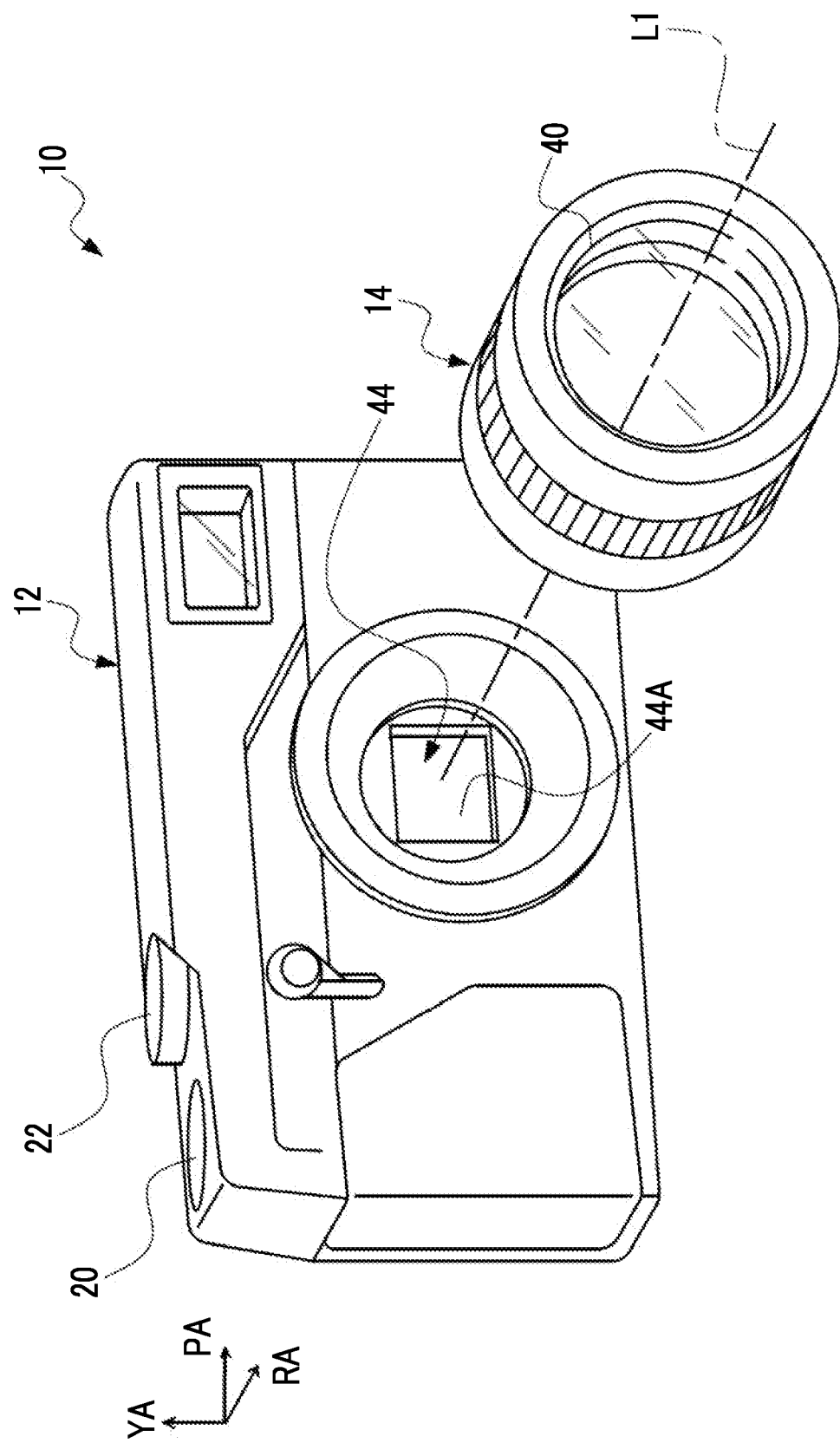
FIG. 1 is a perspective view illustrating an example of an exterior of an imaging apparatus according to first to fifth embodiments.

As illustrated in FIG. 1 as an example, an imaging apparatus 10 is an interchangeable lens camera. The imaging apparatus 10 comprises an imaging apparatus main body 12 and an interchangeable lens 14 that is interchangeably mounted on the imaging apparatus main body 12.

An imaging element 44 is disposed in the imaging apparatus main body 12. In a case where the interchangeable lens 14 is mounted on the imaging apparatus main body 12, subject light showing a subject is transmitted through the interchangeable lens 14, and an image of the subject light is formed on an imaging surface 44A of the imaging element 44.

A release button 20 and a dial 22 are disposed on an upper surface of the imaging apparatus main body 12. The dial 22 is operated in a case of setting an operation mode of an imaging system, an operation mode of a playback system, and the like. The release button 20 functions as an imaging preparation instruction portion and an imaging instruction portion, and a push operation of two stages of an imaging preparation instruction state and an imaging instruction state can be detected. For example, the imaging preparation instruction state refers to a state where a push is performed to an intermediate position (half push position) from a standby position, and the imaging instruction state refers to a state where a push is performed to a final push position (full push position) exceeding the intermediate position. Hereinafter, the "state where a push is performed to the half push position from the standby position" will be referred to as a "half push state", and the "state where a push is performed to the full push position from the standby position" will be referred to as a "full push state". Depending on a configuration of the imaging apparatus, the imaging preparation instruction state may be a state where a finger of an operating user is in contact with the release button 20, and the imaging instruction state may be a state after a transition from the state where the finger of the operating user is in contact with the release button 20 to a state where the finger is separated from the release button 20.

In the imaging apparatus 10, an imaging mode and a playback mode are selectively set as an operation mode in accordance with an instruction of the user. The imaging mode is broadly divided into a display motion picture imaging mode and a recording imaging mode. In each of the display motion picture imaging mode and the recording imaging mode, an AF mode is set in accordance with the instruction of the user.

In the display motion picture imaging mode, in a case where the AF mode is set as focal point adjustment setting of the interchangeable lens 14, imaging for a display motion picture image is performed by setting an exposure state by performing an AE function and performing a focusing control by performing an AF function for each frame. A live view image is generated by performing imaging for the display motion picture image. Generally, the live view image is also referred to as a live preview image. The AE function and the AF function are not necessarily performed for each frame.

The recording imaging mode is broadly divided into a motion picture image recording imaging mode and a still picture image recording imaging mode. The motion picture image recording imaging mode and the still picture image recording imaging mode are selectively set in accordance with the instruction of the user. In the imaging apparatus 10, in the motion picture image recording imaging mode, in a case where the AF mode is set, imaging for a recording motion picture image is performed by setting the exposure state by performing the AE function and performing the focusing control by performing the AF function for each frame. A motion picture image obtained by performing the imaging for the recording motion picture image is recorded on a predetermined storage medium such as a memory card or a USB memory.

In the still picture image recording imaging mode, in a case where the AF mode is set, an imaging condition is adjusted by setting the release button 20 to the half push state. Then, in a case where the full push state is subsequently set, imaging for a still picture image is performed. That is, by setting the release button 20 to the half push state, the exposure state is set by performing the AE function, and then, the focusing control is performed by performing the AF function. In a case where the release button 20 is set to the full push state, imaging for a recording still picture image is performed.

Figure 2:
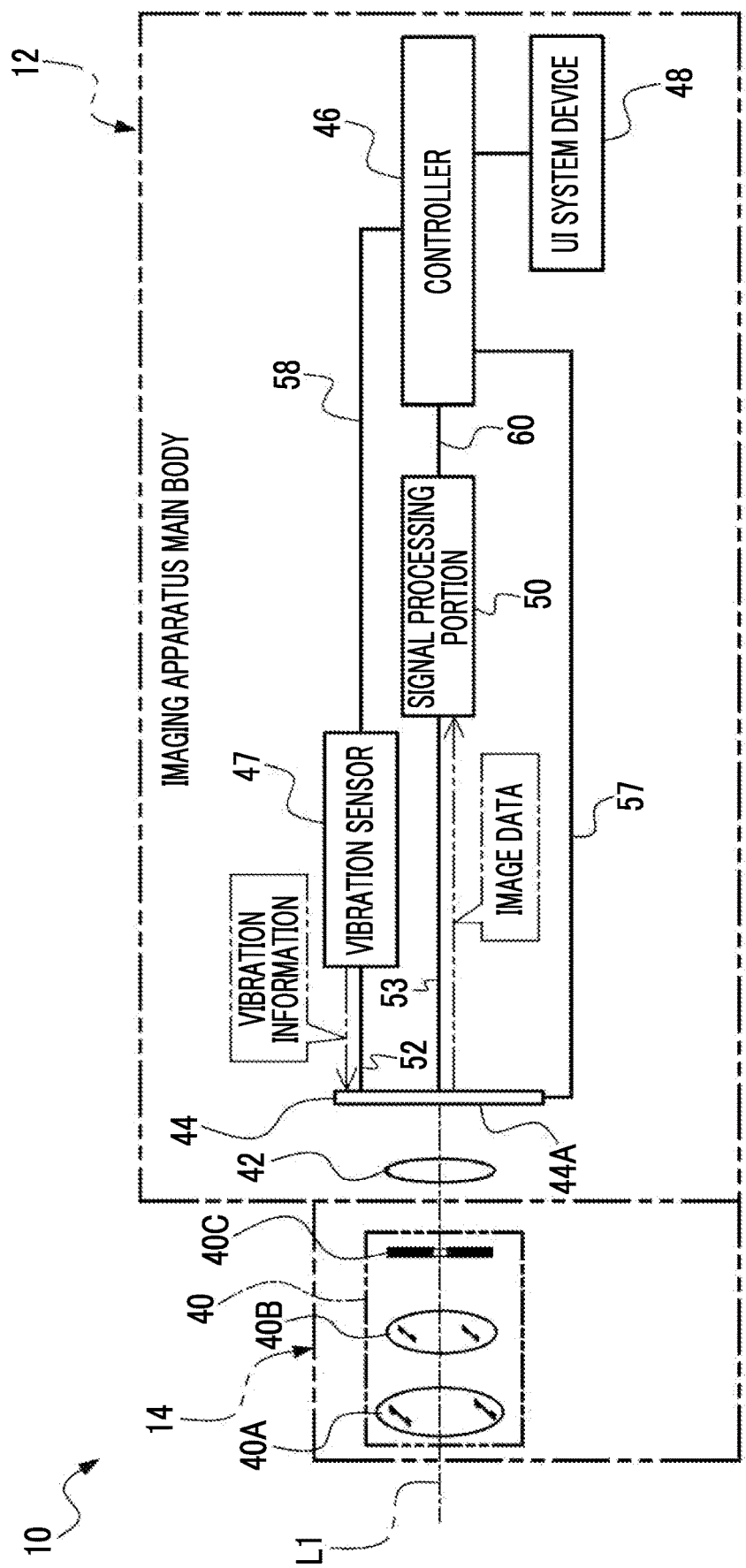
FIG. 2 is a block diagram illustrating an example of a configuration of the imaging apparatus according to the first to third embodiments.

As illustrated in FIG. 2 as an example, the interchangeable lens 14 includes an imaging lens 40. The imaging lens 40 comprises an objective lens 40A, a focus lens 40B, and a stop 40C. The objective lens 40A, the focus lens 40B, and the stop 40C are arranged in an order of the objective lens 40A, the focus lens 40B, and the stop 40C along an optical axis L1 from a subject side to an imaging apparatus main body 12 side. The stop 40C operates by receiving motive power from a driving source (not illustrated) such as a motor. Accordingly, an opening degree of the stop 40C is changed. By changing the opening degree of the stop 40C, exposure is adjusted.

The focus lens 40B is attached to a sliding mechanism (not illustrated) and moves along the optical axis L1 in response to motive power provided from a driving source (not illustrated) such as a motor. In the AF mode, by moving the focus lens 40B along the optical axis L1 under control of the controller 46, the focus lens 40B reaches a focus position corresponding to a subject distance. The "focus position" here refers to a position of the focus lens 40B on the optical axis L1 in a focused state. In a case where the focus lens 40B reaches the focus position corresponding to the subject distance, the image of the subject light is formed on the imaging surface 44A of the imaging element 44 by the imaging lens 40.

The imaging apparatus main body 12 comprises a mechanical shutter 42 and the imaging element 44. The mechanical shutter 42 operates by receiving motive power from a driving source (not illustrated) such as a motor. In a case where the interchangeable lens 14 is mounted on the imaging apparatus main body 12, the subject light is transmitted through the imaging lens 40, and the image of the subject light is formed on the imaging surface 44A of the imaging element 44 through the mechanical shutter 42.

The imaging apparatus main body 12 comprises a vibration sensor 47. The vibration sensor 47 is a device including a gyro sensor and detects an angular velocity exerted on the imaging element 44 as a vibration. For example, a vibration exerted on the imaging element 44 by the user holding the imaging apparatus 10, a vibration caused by a wind to the imaging apparatus 10 installed on a support table such as a tripod, and a vibration exerted from a vehicle are exemplified as the vibration exerted on the imaging element 44.

The gyro sensor detects an angular velocity about each axis (refer to FIG. 1) of a pitch axis PA, a yaw axis YA, and a roll axis RA. The vibration sensor 47 detects the vibration exerted on the imaging element 44 by converting the angular velocity about the pitch axis PA and the angular velocity about the yaw axis YA detected by the gyro sensor into an angular velocity in a two-dimensional plane parallel to the pitch axis PA and the yaw axis YA. A meaning of being parallel in the first embodiment according to the technology of the present disclosure includes a meaning of being completely parallel and also a meaning of being approximately parallel including an error allowed in design and manufacturing.

The vibration sensor 47 is connected to the controller 46 through a communication line 58 and detects the vibration exerted on the imaging element 44 under control of the controller 46. The vibration sensor 47 is connected to the imaging element 44 through a communication line 52. The vibration sensor 47 outputs vibration information indicating the detected vibration to the imaging element 44. Here, an angular velocity is employed as an example of the vibration information. The vibration information may be data such as the angular velocity or information obtained by processing the data by any processing.

The imaging apparatus main body 12 comprises the controller 46, a UI system device 48, and a signal processing portion 50. Each of the controller 46 and the signal processing portion 50 is implemented by an LSI. In addition, each of the controller 46 and the signal processing portion 50 is positioned on a rear stage of the imaging element 44 and thus, is referred to as a rear stage circuit of the imaging element 44.

The controller 46 controls the entire imaging apparatus 10. The UI system device 48 is a device that presents information to the user or receives the instruction from the user. The UI system device 48 is connected to the controller 46. The controller 46 acquires various types of information from the UI system device 48 and controls the UI system device 48.

The imaging element 44 is connected to the controller 46 through a communication line 57 and generates image data indicating an image of the subject by imaging the subject under control of the controller 46.

The imaging element 44 is connected to the signal processing portion 50 through a communication line 53. The signal processing portion 50 is a device including an ASIC. The controller 46 is connected to the signal processing portion 50 through a communication line 60.

The image data is input into the signal processing portion 50 from the imaging element 44 through the communication line 53. The signal processing portion 50 performs various types of signal processing on the image data. The various types of signal processing include well-known signal processing such as white balance adjustment, sharpness adjustment, gamma correction, color space conversion processing, and color difference correction.

While the device including the ASIC is illustrated as the signal processing portion 50 in the first embodiment, the technology of the present disclosure is not limited thereto. The signal processing portion 50 may be a device including an ASIC, an FPGA, and/or a PLD. In addition, the signal processing portion 50 may be a computer including a CPU, a ROM, and a RAM. The number of CPUs may be singular or plural. In addition, the signal processing portion 50 may be implemented by a combination of a hardware configuration and a software configuration.

The imaging element 44 is an example of a "laminated imaging element" according to the embodiments of the technology of the present disclosure. In the present embodiment, the imaging element 44 is a CMOS image sensor. In addition, while the CMOS image sensor is illustrated here as the imaging element 44, the technology of the present disclosure is not limited thereto. For example, the technology of the present disclosure is also established in a case where the imaging element 44 is a CCD image sensor.

Figure 3A:
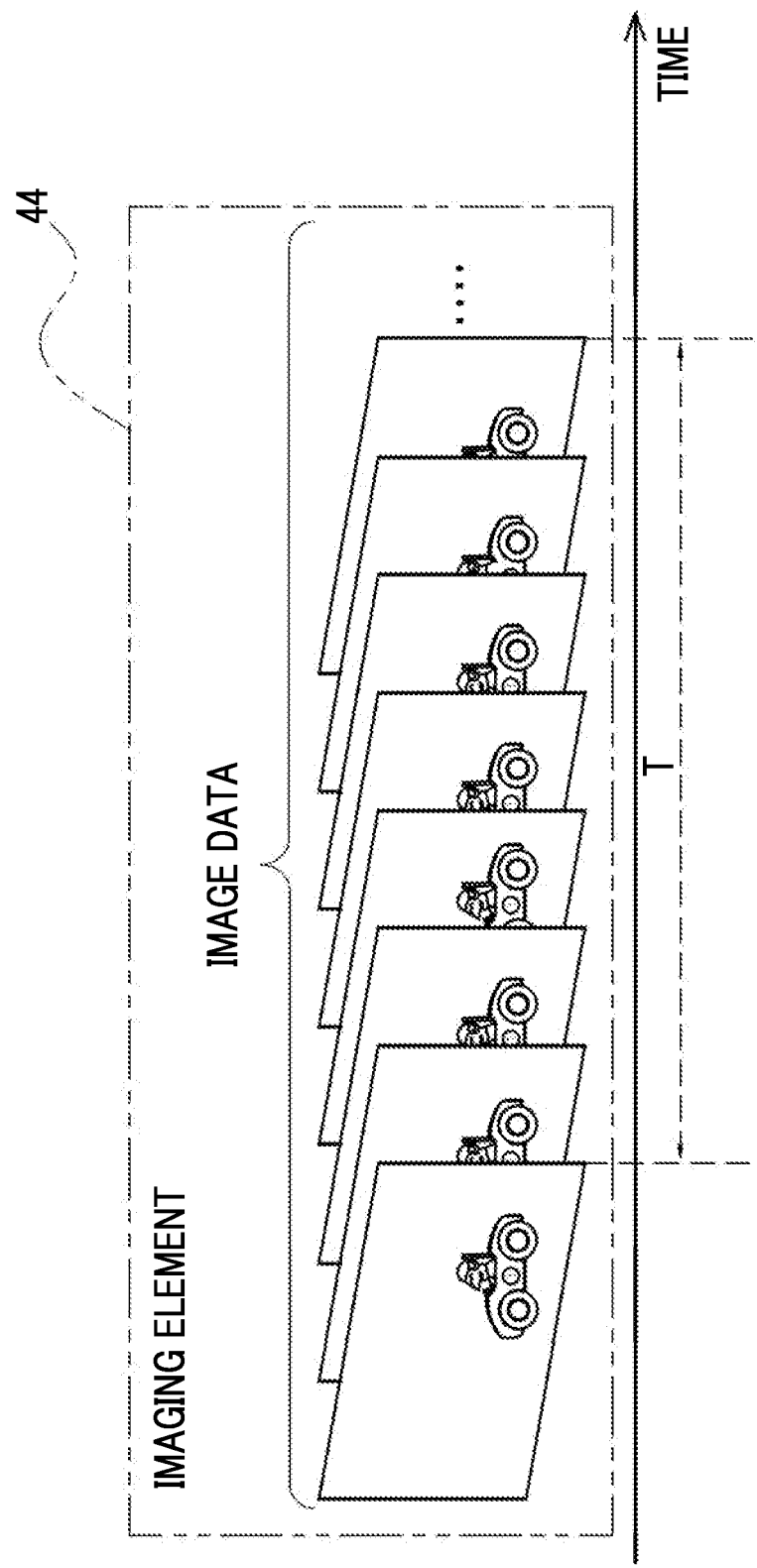
FIG. 3A is a conceptual diagram for describing an imaging frame rate of an imaging element included in the imaging apparatus according to the first to fifth embodiments.

In the imaging element 44, as illustrated in FIG. 3A as an example, the image data of a plurality of frames each indicating the image of the subject is generated by imaging the subject at an imaging frame rate. In addition, the image data of the plurality of frames generated by the imaging element 44 is output at an output frame rate. Any of the imaging frame rate and the output frame rate is a variable frame rate. The output frame rate is an example of a "first frame rate" according to the embodiments of the technology of the present disclosure, and the imaging frame rate is an example of a "second frame rate" according to the embodiments of the technology of the present disclosure.

Figure 3B:
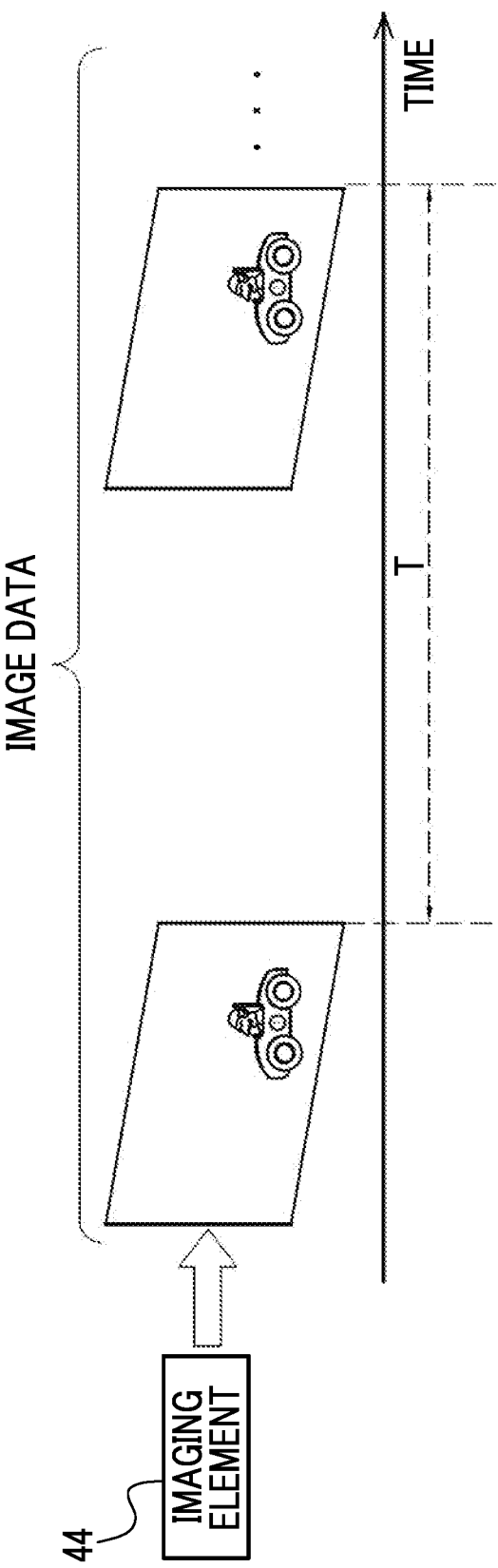
FIG. 3B is a conceptual diagram for describing an output frame rate of the imaging element included in the imaging apparatus according to the first to fifth embodiments.

The imaging frame rate and the output frame rate have a relationship of "imaging frame rate≥output frame rate". That is, the imaging frame rate is a frame rate higher than or equal to the output frame rate. For example, the imaging frame rate is a frame rate at which imaging of eight frames is performed within a period T as illustrated in FIG. 3A, and the output frame rate is a frame rate at which two frames are output within the period T as illustrated in FIG. 3B. Specifically, 240 frames per second (fps) is exemplified as an example of the imaging frame rate, and 60 fps is exemplified as an example of the output frame rate.

As illustrated in FIG. 4 as an example, the controller 46 comprises a CPU 46A, a storage 46B, a memory 46C, a first communication I/F 46D1, and a second communication I/F 46D2. The CPU 46A, the storage 46B, the memory 46C, the first communication I/F 46D1, and the second communication I/F 46D2 are connected to each other through a busline 88.

The storage 46B stores a control program of the imaging apparatus 10. The CPU 46A reads out the control program from the storage 46B and loads the read control program into the memory 46C. The CPU 46A controls the entire imaging apparatus 10 in accordance with the control program loaded in the memory 46C.

Each of the first communication I/F 46D1 and the second communication I/F 46D2 is a communication device including an FPGA. For example, the first communication I/F 46D1 and the second communication I/F 46D2 employ a PCI-e connection standard. The first communication I/F 46D1 is connected to the signal processing portion 50 through the communication line 60. The image data on which the various types of signal processing are performed by the signal processing portion 50 is input into the first communication I/F 46D1 through the communication line 60. The first communication I/F 46D1 transfers the image data input from the signal processing portion 50 to the CPU 46A.

The second communication I/F 46D2 is connected to the imaging element 44 through the communication line 57. The CPU 46A controls the imaging element 44 through the second communication I/F 46D2. In addition, the second communication I/F 46D2 is connected to the vibration sensor 47 through the communication line 58. The CPU 46A controls the vibration sensor 47 through the second communication I/F 46D2.

The UI system device 48 comprises a touch panel display 26 and a reception device 84. A display 32 is connected to the busline 88. A liquid crystal display is exemplified as an example of the display 32. Instead of the liquid crystal display, the display 32 may be a display of other types such as an organic EL display. The display 32 displays various images such as the live view image and the still picture image and also text information under control of the CPU 46A.

The reception device 84 comprises a hard key portion 25 and a touch panel 34. The hard key portion 25 includes a plurality of hard keys including the release button 20 and the dial 22. The touch panel 34 is a transmissive touch panel and is overlaid on a surface of a display region of the display 32. The touch panel 34 senses a contact of an instruction object such as a finger or a stylus pen. The hard key portion 25 and the touch panel 34 are connected to the busline 88, and the CPU 46A operates in accordance with various instructions received by each of the hard key portion 25 and the touch panel 34.

As illustrated in FIG. 5 as an example, the imaging element 44 incorporates a photoelectric conversion element 61, a processing circuit 62, and a memory 64. The imaging element 44 is an imaging element in which the photoelectric conversion element 61, the processing circuit 62, and the memory 64 are formed in one chip. That is, the photoelectric conversion element 61, the processing circuit 62, and the memory 64 are formed in one package. In the imaging element 44, the photoelectric conversion element 61 is laminated with the processing circuit 62 and the memory 64. Specifically, the photoelectric conversion element 61 and the processing circuit 62 are electrically connected to each other by a bump (not illustrated) of copper or the like having conductivity. The processing circuit 62 and the memory 64 are also electrically connected to each other by a bump (not illustrated) of copper or the like having conductivity.

The processing circuit 62 is, for example, an LSI, and the memory 64 is, for example, a DRAM. However, the technology of the present disclosure is not limited thereto, and an SRAM may be employed as the memory 64 instead of the DRAM.

The processing circuit 62 is a device including an ASIC and an FPGA and controls the entire imaging element 44 in accordance with an instruction of the controller 46. While an example of implementing the processing circuit 62 by the device including the ASIC and the FPGA is exemplified here, the technology of the present disclosure is not limited thereto. For example, a device including an ASIC, an FPGA, and/or a PLD may be used. In addition, a computer including a CPU, a storage, and a memory may be employed as the processing circuit 62. The number of CPUs may be singular or plural. In addition, the processing circuit 62 may be implemented by a combination of a hardware configuration and a software configuration.

The photoelectric conversion element 61 includes multiple photodiodes arranged in a matrix form. Photodiodes of "4896×3265" pixels are exemplified as an example of the plurality of photodiodes.

Color filters are arranged in each photodiode included in the photoelectric conversion element 61. The color filters include a G filter corresponding to green (G) that most contributes to obtaining a brightness signal, an R filter corresponding to red (R), and a B filter corresponding to blue (B). The photoelectric conversion element 61 includes R pixels, G pixels, and B pixels (refer to FIG. 6). The R pixels are pixels corresponding to photodiodes in which the R filter is arranged. The G pixels are pixels corresponding to photodiodes in which the G filter is arranged. The B pixels are pixels corresponding to photodiodes in which the B filter is arranged.

The imaging element 44 has a so-called electronic shutter function and controls an electric charge accumulation time period of each photodiode in the photoelectric conversion element 61 by performing the electronic shutter function under control of the controller 46. The electric charge accumulation time period refers to a so-called shutter speed.

In the imaging apparatus 10, the imaging for the still picture image and imaging for the motion picture image are performed using a rolling shutter method. In the still picture image recording imaging mode, the imaging for the still picture image is implemented by performing the electronic shutter function and operating the mechanical shutter 42 (refer to FIG. 2). In addition, in the still picture image recording imaging mode, imaging for continuous shooting can be implemented by performing the electronic shutter function without operating the mechanical shutter 42. In addition, in the motion picture image recording imaging mode, the imaging for the motion picture image is implemented by performing the electronic shutter function without operating the mechanical shutter 42. Furthermore, in the display motion picture imaging mode, imaging for the live view image is also implemented by performing the electronic shutter function without operating the mechanical shutter 42. Here, while the rolling shutter method is illustrated as a method of implementing the electronic shutter function, the technology of the present disclosure is not limited thereto. A global shutter method may be applied instead of the rolling shutter method.

The processing circuit 62 reads out the image data obtained by imaging the subject by the photoelectric conversion element 61. The image data is signal electric charges accumulated in the photoelectric conversion element 61. The processing circuit 62 performs A/D conversion on analog image data read out from the photoelectric conversion element 61. The processing circuit 62 stores digital image data obtained by performing the A/D conversion on the analog image data in the memory 64. Here, the processing circuit 62 is an example of a "first processor" according to the embodiments of the technology of the present disclosure, and the memory 64 is an example of a "memory" according to the embodiments of the technology of the present disclosure. The digital image data is an example of "first image data" according to the embodiments of the technology of the present disclosure.

The processing circuit 62 is connected to the signal processing portion 50 through the communication line 53. In addition, the processing circuit 62 is connected to the second communication I/F 46D2 of the controller 46 through the communication line 57.

The memory 64 comprises a plurality of storage regions. For example, each storage region stores the digital image data for each frame. In addition, the plurality of storage regions are randomly accessed by the processing circuit 62.

Figure 6:
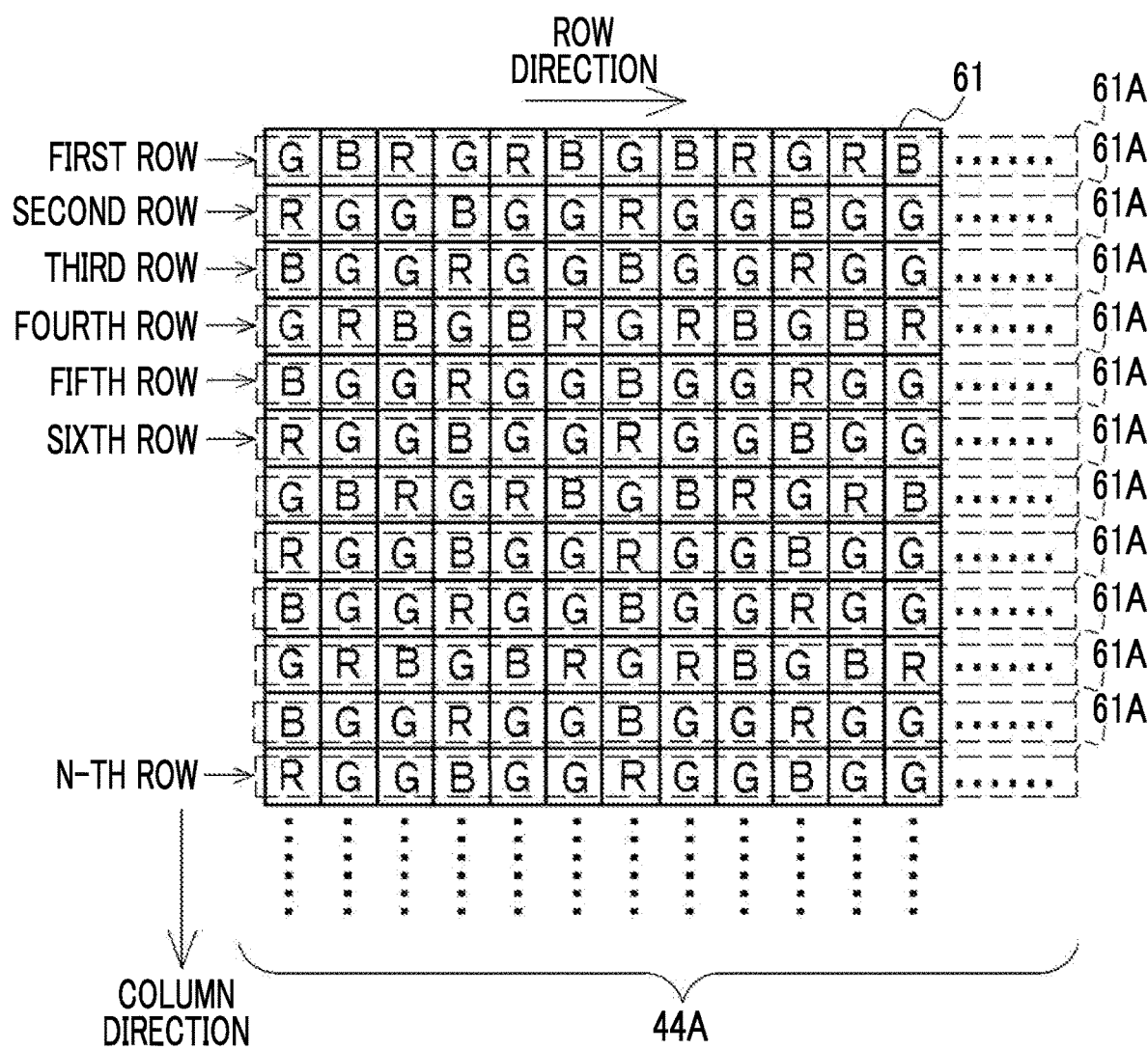
FIG. 6 is an arrangement diagram illustrating an example of arrangement, on an imaging surface, of each pixel included in a photoelectric conversion element of the imaging element included in the imaging apparatus according to the first to fifth embodiments.

As illustrated in FIG. 6 as an example, the R pixels, the G pixels, and the B pixels are arranged on the imaging surface 44A of the photoelectric conversion element 61 with predetermined periodicity in each of a row direction (horizontal direction) and a column direction (vertical direction). In the first embodiment, the R pixels, the G pixels, and the B pixels are arranged with periodicity corresponding to X-Trans (registered trademark) arrangement. While the X-Trans arrangement is illustrated in the example illustrated in FIG. 6, the technology of the present disclosure is not limited thereto. Arrangement of the R pixels, the G pixels, and the B pixels may be Bayer arrangement or honeycomb arrangement.

The imaging element 44 includes a plurality of pixel lines 61A. In each pixel line 61A, the R pixels, the G pixels, and the B pixels are arranged along the row direction. The plurality of pixel lines 61A are an example of a "plurality of pixel lines" according to the embodiments of the technology of the present disclosure.

Figure 7:
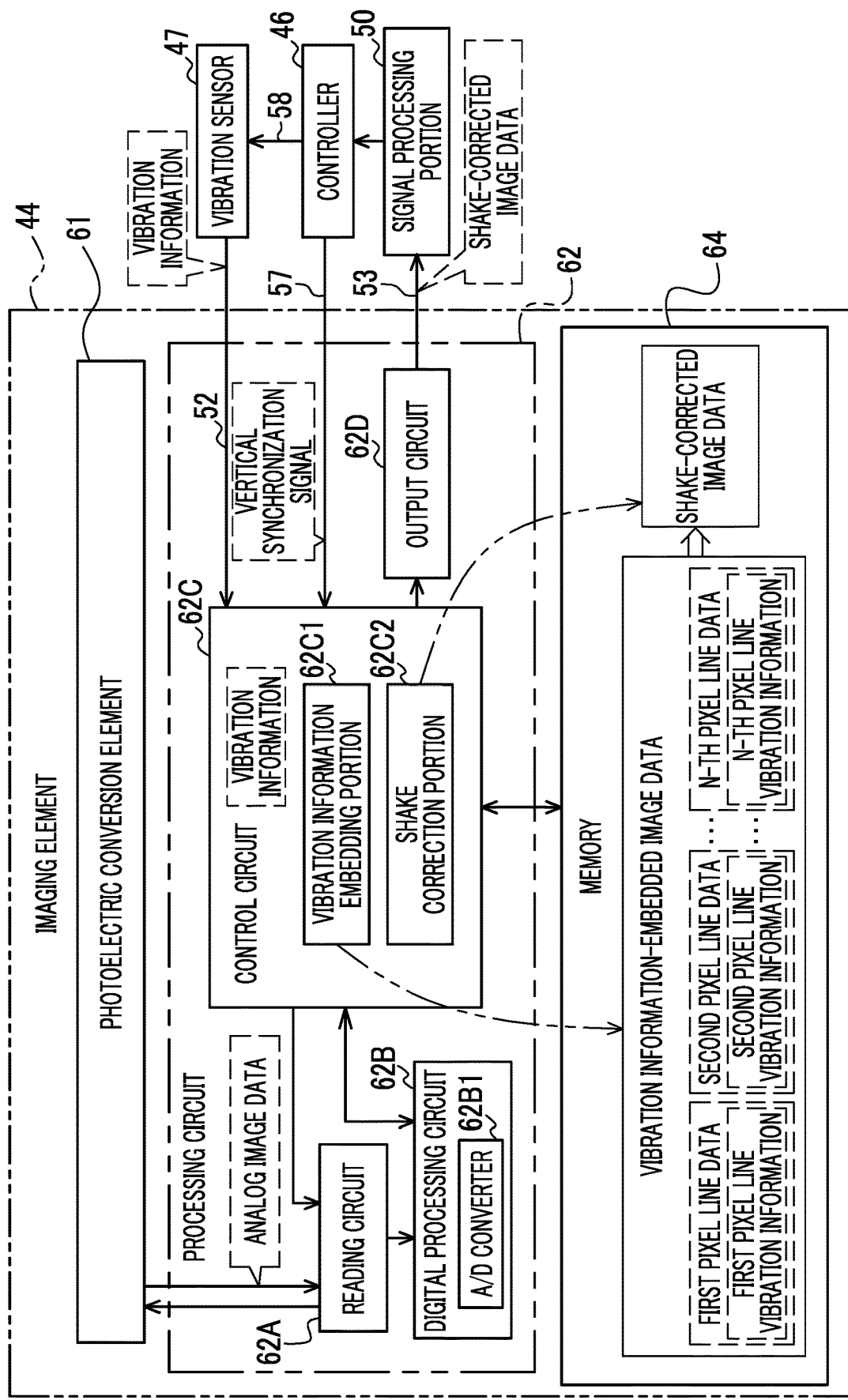
FIG. 7 is a block diagram illustrating an example of a configuration of an electric system of the imaging element included in the imaging apparatus according to the first embodiment.

As illustrated in FIG. 7 as an example, the processing circuit 62 comprises a reading circuit 62A, a digital processing circuit 62B, a control circuit 62C, and an output circuit 62D.

The reading circuit 62A is connected to the photoelectric conversion element 61, the digital processing circuit 62B, and the control circuit 62C. The memory 64 is connected to the control circuit 62C. The output circuit 62D is also connected to the control circuit 62C. The control circuit 62C is connected to the controller 46 through the communication line 57 and is connected to the vibration sensor 47 through the communication line 52. The output circuit 62D is connected to the signal processing portion 50 through the communication line 53.

The controller 46 supplies a timing control signal to the control circuit 62C through the communication line 57. The timing control signal includes a vertical synchronization signal. The vertical synchronization signal is a synchronization signal for defining an exposure period in units of frames.

The reading circuit 62A reads out, in units of horizontal pixel lines, the analog image data that is obtained by imaging the subject at the imaging frame rate. That is, the reading circuit 62A controls the photoelectric conversion element 61 and reads out the analog image data from the photoelectric conversion element 61 in units of horizontal pixel lines under control of the control circuit 62C.

The reading circuit 62A performs analog signal processing on the analog image data read out from the photoelectric conversion element 61. The analog signal processing includes well-known processing such as correlative double sampling processing, analog gain processing, and noise cancelation processing. The correlative double sampling processing is processing of reducing a thermal noise in the analog image data. The analog gain processing is processing of applying a gain to the analog image data. The noise cancelation processing is processing of canceling a noise caused by variations in characteristics between pixels included in the photoelectric conversion element 61. The analog image data on which the analog signal processing is performed in such a manner is output to the digital processing circuit 62B by the reading circuit 62A.

The digital processing circuit 62B comprises an A/D converter 62B1. The digital processing circuit 62B performs digital signal processing on the analog image data input from the reading circuit 62A. For example, the digital signal processing includes A/D conversion performed by the A/D converter 62B1 and digital gain processing.

The A/D converter 62B1 performs the A/D conversion on the analog image data. Accordingly, the analog image data is digitized, and the digital image data is obtained. The digital gain processing is performed on the digital image data by the digital processing circuit 62B. The digital gain processing refers to processing of applying a gain to the digital image data.

The control circuit 62C acquires the digital image data obtained by the digital signal processing from the digital processing circuit 62B in units of horizontal pixel lines. Here, the analog signal processing performed by the reading circuit 62A and the digital signal processing performed by the digital processing circuit 62B are an example of "image data processing" according to the embodiments of the technology of the present disclosure.

The controller 46 supplies the vertical synchronization signal to the vibration sensor 47 through the communication line 58. The vibration sensor 47 receives the vertical synchronization signal and detects the angular velocity exerted on the imaging element 44 within the exposure period of the image data of one frame in units of horizontal pixel lines. The vibration sensor 47 supplies the angular velocity to the control circuit 62C. The angular velocity is an example of "vibration information" according to the embodiments of the technology of the present disclosure.

The control circuit 62C comprises a vibration information embedding portion 62C1 and a shake correction portion 62C2. The vibration information embedding portion 62C1 receives the vibration information from the vibration sensor 47 within a frame output period defined by the output frame rate. The vibration information embedding portion 62C1 embeds the vibration information at a specific position set in the digital image data within the frame output period and outputs the digital image data in which the vibration information is embedded to the memory 64.

Figure 8:
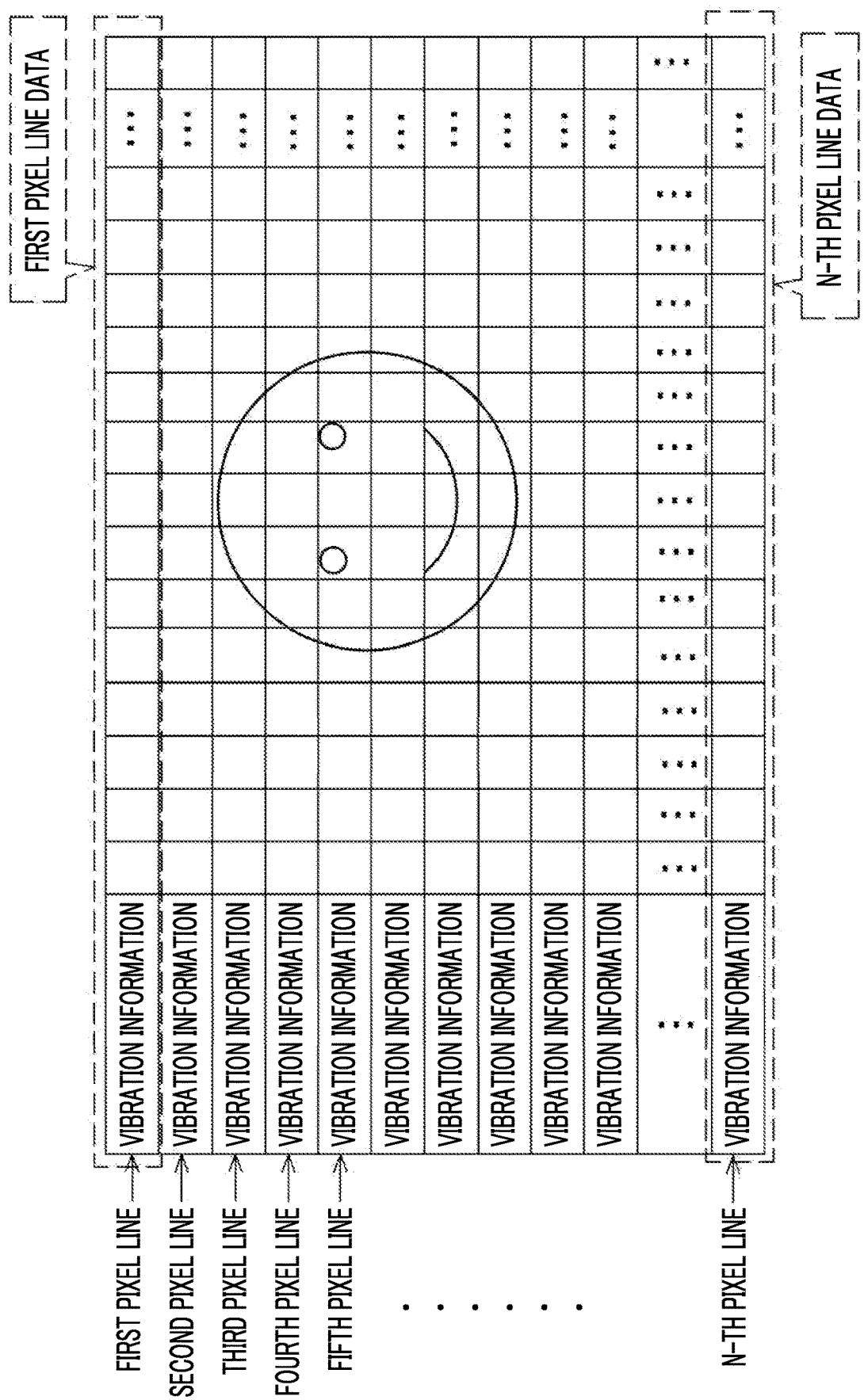
FIG. 8 is a conceptual diagram illustrating an example of vibration information-embedded image data generated by the imaging element included in the imaging apparatus according to the first embodiment.

As illustrated in FIG. 8 as an example, the digital image data of one frame consists of pixel line data of N lines including first pixel line data, second pixel line data, . . . , N-th pixel line data. Here, a horizontal pixel line of one line constituting an uppermost line of the photoelectric conversion element 61 will be referred to as a first pixel line, and pixel data read out from the first pixel line will be referred to as the first pixel line data. A horizontal pixel line of one line constituting a second line of the photoelectric conversion element 61 will be referred to as a second pixel line, and pixel data read out from the second pixel line will be referred to as the second pixel line data. Similarly, hereinafter, a horizontal pixel line of a lowermost line as the N-th line will be referred to as an N-th pixel line, and pixel data read out from the N-th pixel line will be referred to as the N-th pixel line data.

The first, second, . . . , N-th pixel lines will be simply referred to as the "pixel line" unless otherwise necessary to distinguish therebetween. In addition, the first, second, . . . , N-th pixel line data will be simply referred to as the "pixel line data" unless otherwise necessary to distinguish therebetween. Here, the pixel line data is an example of "pixel line data" according to the embodiments of the technology of the present disclosure.

The vibration information embedding portion 62C1 embeds pixel line vibration information in a head of the pixel line data. The pixel line vibration information refers to information indicating the vibration acquired by the vibration sensor 47 during the exposure period of one pixel line. Specifically, the pixel line vibration information refers to the vibration information input into the imaging element 44 from the vibration sensor 47 during the exposure period of one pixel line. In the head of each pixel line data, a bit region for embedding the corresponding pixel line vibration information is set in advance. The head of each pixel line data is an example of a "specific position" according to the embodiments of the technology of the present disclosure.

The vibration information embedding portion 62C1 stores the pixel line data in which the pixel line vibration information is embedded in the corresponding storage region of the memory 64.

The memory 64 is a memory that can store vibration information-embedded image data of the plurality of frames. The pixel line data in which the pixel line vibration information is embedded is stored in the memory 64 in units of frames as the vibration information-embedded image data. The vibration information-embedded image data is an example of "second image data" according to the embodiments of the technology of the present disclosure.

The control circuit 62C can randomly access the memory 64, and reads out the vibration information-embedded image data from the memory 64 and supplies the vibration information-embedded image data to the shake correction portion 62C2 within the frame output period. The frame output period is an example of a "frame output period" according to the embodiments of the technology of the present disclosure. Here, the frame output period refers to a time interval between frames of which output timings defined by the output frame rate are adjacent on a time axis.

The shake correction portion 62C2 reads out N pieces of the pixel line vibration information from the vibration information-embedded image data and calculates an average value of the pixel line vibration information. The shake correction portion 62C2 performs known shake correction processing on the vibration information-embedded image data based on the calculated average value. The shake correction portion 62C2 stores the image data after the shake correction processing in the memory 64 as shake-corrected image data within the frame output period. The shake correction processing is an example of "shake correction processing" according to the embodiments of the technology of the present disclosure.

The control circuit 62C reads out the shake-corrected image data from the memory 64 and outputs the shake-corrected image data to the output circuit 62D within the frame output period. The output circuit 62D outputs the input shake-corrected image data to the signal processing portion 50.

As illustrated in FIG. 9 as an example, for example, the vertical synchronization signal falls four times within one frame output period defined by the output frame rate. The exposure period of the imaging element 44 is started in synchronization with the falling of the vertical synchronization signal. Thus, according to the first embodiment, the digital image data of four frames is acquired within one frame output period.

The photoelectric conversion element 61 is reset in synchronization with the falling of the vertical synchronization signal and starts exposure. Since the imaging apparatus 10 employs the rolling shutter method, the exposure is started while a constant time interval is maintained for each horizontal pixel line. That is, in the exposure period of one frame illustrated in a diagonal line part of FIG. 9, an uppermost region 90 extending along the time axis indicates the exposure period of the first pixel line, and a lowermost region 92 represents the exposure period of the N-th pixel line.

The vibration sensor 47 acquires the vibration information in units of horizontal pixel lines at a center of the predetermined exposure period. The vibration sensor 47 sequentially acquires the vibration information of N lines corresponding to the first pixel line to the N-th pixel line at the constant time interval. The vibration sensor 47 outputs the vibration information of N lines to the vibration information embedding portion 62C1.

In a case where the predetermined exposure period is finished, the reading circuit 62A reads out analog pixel line data from the photoelectric conversion element 61 in units of horizontal pixel lines. The reading circuit 62A performs the analog signal processing on the analog pixel line data and outputs the pixel line data after the analog signal processing to the digital processing circuit 62B.

The digital processing circuit 62B converts the analog pixel line data into digital pixel line data by performing the digital signal processing on the analog pixel line data. Then, the digital processing circuit 62B outputs the pixel line data after the digital signal processing to the vibration information embedding portion 62C1.

The vibration information embedding portion 62C1 embeds the corresponding pixel line vibration information in the head of the pixel line data. The vibration information embedding portion 62C1 sequentially stores the pixel line data in which the pixel line vibration information is embedded in the memory 64. In a case where the pixel line data in which the pixel line vibration information is embedded is stored for all pixel lines, the shake correction portion 62C2 reads out the vibration information-embedded image data of one frame. The shake correction portion 62C2 calculates the average value of the pixel line vibration information of N lines and performs the shake correction processing on the vibration information-embedded image data using the average value. The shake correction portion 62C2 stores the shake-corrected image data generated by the shake correction processing in the memory 64.

The output circuit 62D outputs the shake-corrected image data generated at the end of each frame output period to the signal processing portion 50 on a rear stage. That is, in the shake-corrected image data of four frames generated within each frame output period, only the shake-corrected image data of one frame generated at the end of each frame output period is output to the signal processing portion 50 through the output circuit 62D. The shake-corrected image data of the remaining three frames is not output and is deleted from the memory 64. Here, while an example of a form in which the shake-corrected image data of one frame generated at the end of the frame output period is output to the signal processing portion 50 is exemplified, the technology of the present disclosure is not limited thereto. The shake-corrected image data of another predetermined frame may be output to the signal processing portion 50.

Next, an action of the imaging element 44 according to the first embodiment will be described.

Figure 10A:
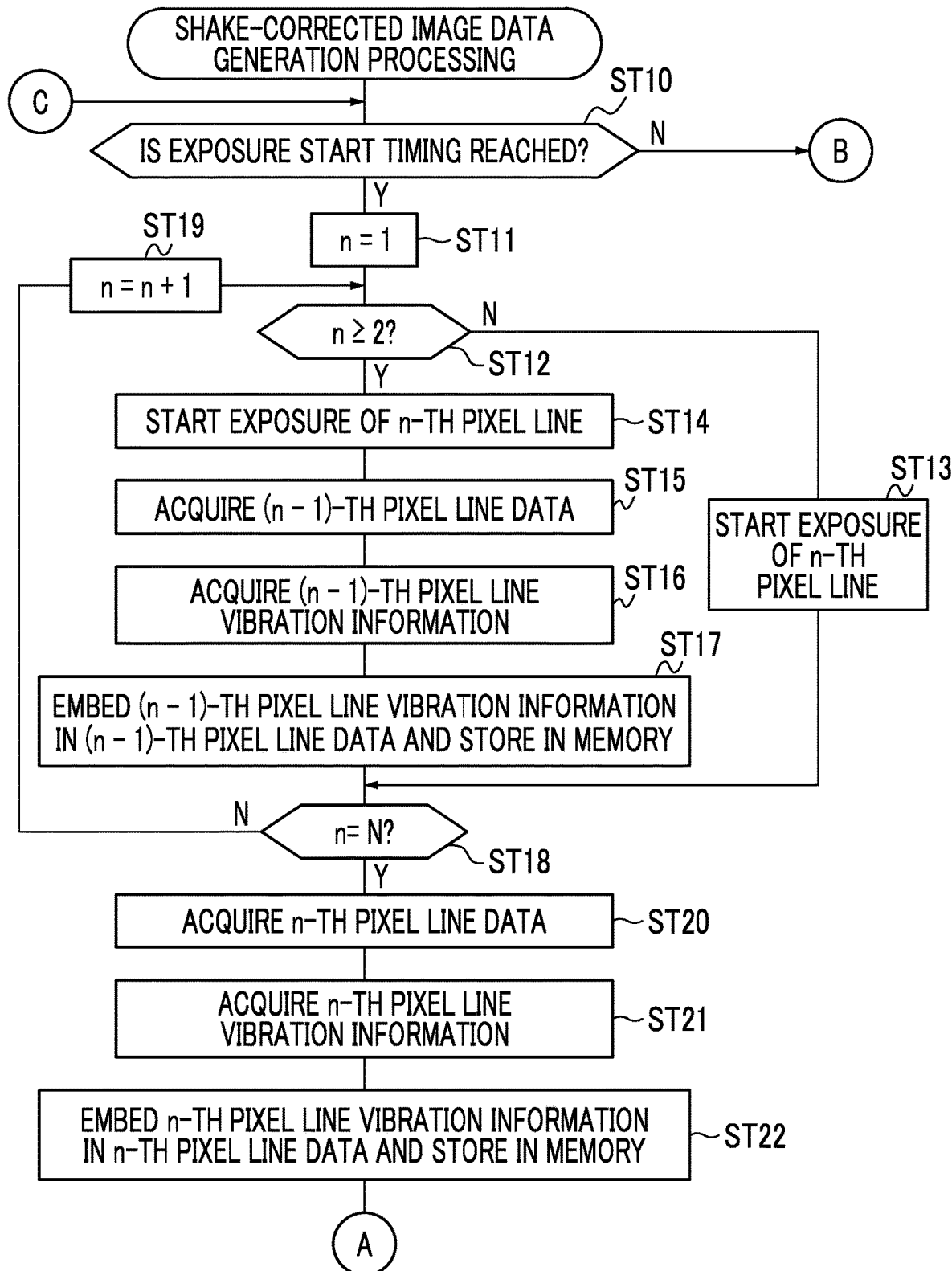
FIG. 10A is a flowchart illustrating an example of a flow of shake-corrected image data generation processing according to the first embodiment.
Figure 10B:
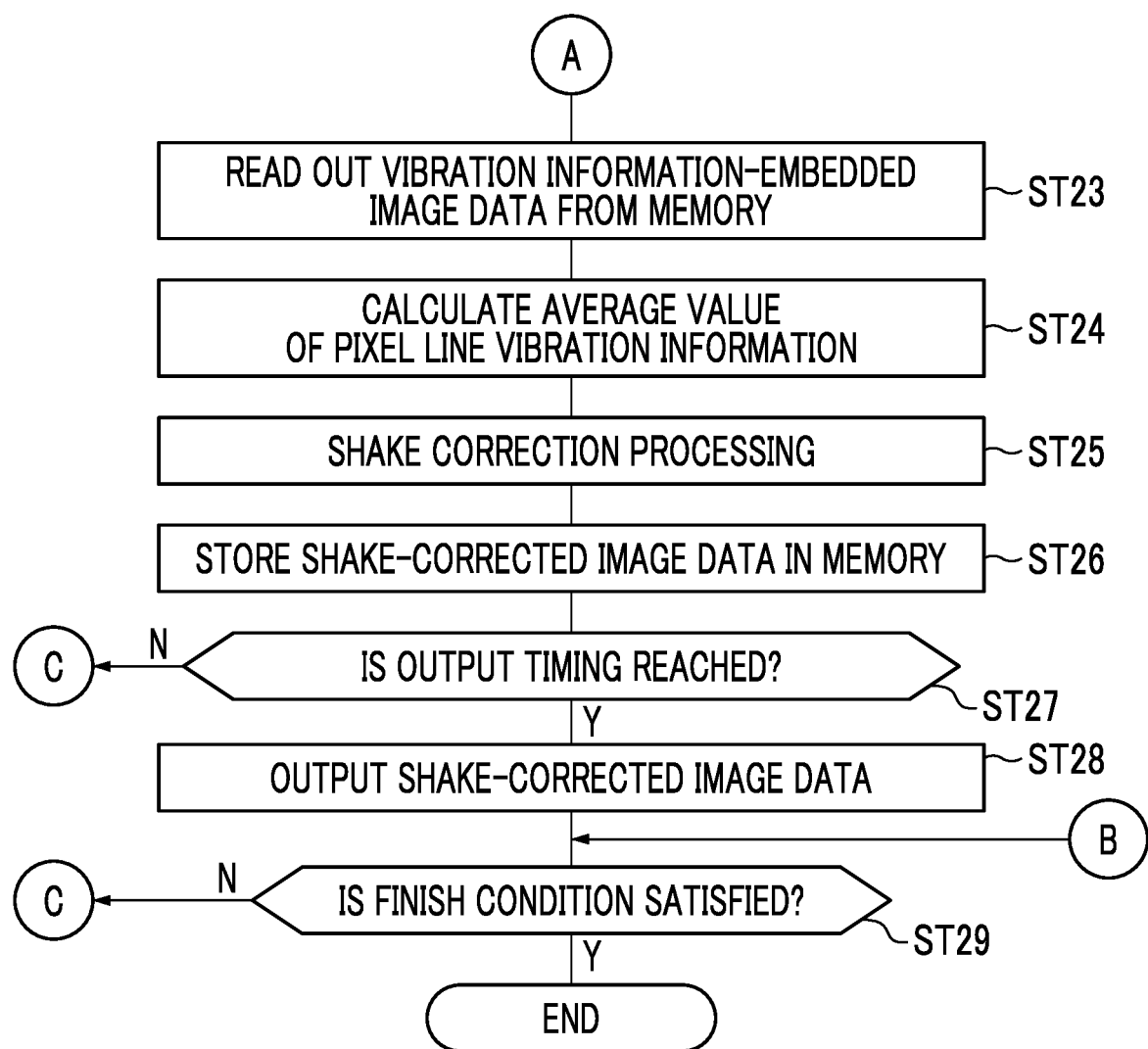
FIG. 10B is a flowchart illustrating the example of the flow of shake-corrected image data generation processing according to the first embodiment.

FIG. 10A and FIG. 10B illustrate an example of a flow of shake-corrected image data generation processing executed within the frame output period by the processing circuit 62 of the imaging element 44.

In the shake-corrected image data generation processing illustrated in FIG. 10A and FIG. 10B, first, in step ST10, the vibration information embedding portion 62C1 determines whether or not an exposure start timing is reached. The exposure of the imaging element 44 is started in synchronization with the falling of the vertical synchronization signal output from the controller 46. In step ST10, in a case where the exposure start timing is not reached, a negative determination is made, and the shake-corrected image data generation processing transitions to step ST26 illustrated in FIG. 10B. In step ST10, in a case where the exposure start timing is reached, a positive determination is made, and the shake-corrected image data generation processing transitions to step ST11.

In step ST11, the vibration information embedding portion 62C1 sets a variable n to 1. The variable n represents the number of pixel lines included in the imaging element 44. Then, the shake-corrected image data generation processing transitions to step ST12.

In step ST12, the vibration information embedding portion 62C1 determines whether or not the variable n is greater than or equal to 2. In step ST12, in a case where the variable n is 1, a negative determination is made, and the shake-corrected image data generation processing transitions to step ST13. In step ST12, in a case where the variable n is greater than or equal to 2, a positive determination is made, and the shake-corrected image data generation processing transitions to step ST14. First, a case where the variable n is 1 will be described.

In step ST13, the vibration information embedding portion 62C1 starts the exposure of the n-th pixel line by controlling the reading circuit 62A. That is in a case of n=1, the exposure of the first pixel line is started in step ST13. Then, the shake-corrected image data generation processing transitions to step ST18.

In step ST18, the vibration information embedding portion 62C1 determines whether or not the variable n is equal to the number N of pixel lines included in the imaging element 44. In a case where the variable n is 1, the variable n is not equal to the number N of pixel lines. Thus, a negative determination is made in step ST18, and the shake-corrected image data generation processing transitions to step ST19.

In step ST19, the vibration information embedding portion 62C1 increases the variable n by 1 by adding 1 to the variable n. That is, the variable n is incremented to 2. Then, the shake-corrected image data generation processing transitions to step ST12. Hereinafter, a case where the variable n is greater than or equal to 2 will be described.

In step ST12, since the variable n is greater than or equal to 2, a positive determination is made, and the shake-corrected image data generation processing transitions to step ST14.

In step ST14, the vibration information embedding portion 62C1 starts the exposure of the n-th pixel line. Then, the shake-corrected image data generation processing transitions to step ST15.

In step ST15, the vibration information embedding portion 62C1 acquires the (n−1)-th pixel line data by controlling the reading circuit 62A and the digital processing circuit 62B. Then, the shake-corrected image data generation processing transitions to step ST16.

In step ST16, the vibration information embedding portion 62C1 acquires the (n−1)-th pixel line vibration information from the vibration sensor 47. Then, the shake-corrected image data generation processing transitions to step ST17.

In step ST17, the vibration information embedding portion 62C1 embeds the (n−1)-th pixel line vibration information in the (n−1)-th pixel line data and stores the (n−1)-th pixel line data in which the (n−1)-th pixel line vibration information is embedded in the memory 64. Then, the shake-corrected image data generation processing transitions to step ST18.

In step ST18, the vibration information embedding portion 62C1 determines whether or not the variable n is equal to the number N of pixel lines included in the imaging element 44. In step ST18, in a case where the variable n is not equal to the number N of pixel lines, a negative determination is made, and the shake-corrected image data generation processing transitions to step ST19. In step ST18, in a case where the variable n is equal to the number N of pixel lines, a positive determination is made, and the shake-corrected image data generation processing transitions to step ST20.

In step ST19, the vibration information embedding portion 62C1 increases the variable n by 1 by adding 1 to the variable n. Then, the shake-corrected image data generation processing transitions to step ST12. Accordingly, in the shake-corrected image data generation processing, step ST12 to step ST17 are repeated while the variable n is incremented by 1 from 2 to N. In a case where the variable n reaches the number N of pixel lines, the shake-corrected image data generation processing transitions to step ST20.

In step ST20, the vibration information embedding portion 62C1 acquires the n-th pixel line data by controlling the reading circuit 62A and the digital processing circuit 62B. Then, the shake-corrected image data generation processing transitions to step ST21.

In step ST21, the vibration information embedding portion 62C1 acquires the n-th pixel line vibration information from the vibration sensor 47. Then, the shake-corrected image data generation processing transitions to step ST22.

In step ST22, the vibration information embedding portion 62C1 embeds the n-th pixel line vibration information in the n-th pixel line data and stores the n-th pixel line data in which the n-th pixel line vibration information is embedded in the memory 64. Then, the shake-corrected image data generation processing transitions to step ST23 illustrated in FIG. 10B.

In step ST23 illustrated in FIG. 10B, the shake correction portion 62C2 reads out the vibration information-embedded image data of one frame from the memory 64. Then, the shake-corrected image data generation processing transitions to step ST24.

In step ST24, the shake correction portion 62C2 calculates the average value of the pixel line vibration information included in the vibration information-embedded image data read out in step ST23. Then, the shake-corrected image data generation processing transitions to step ST25.

In step ST25, the shake correction portion 62C2 generates the shake-corrected image data by performing the shake correction processing on the vibration information-embedded image data based on the average value calculated in step ST24. Then, the shake-corrected image data generation processing transitions to step ST26.

In step ST26, the shake correction portion 62C2 stores the shake-corrected image data generated in step ST25 in the memory 64. Then, the shake-corrected image data generation processing transitions to step ST27.

In step ST27, the shake correction portion 62C2 determines whether or not the output timing of the shake-corrected image data is reached. The output timing of the shake-corrected image data is a timing defined by the frame output period. In a case where the output timing of the shake-corrected image data is reached, a positive determination is made, and the shake-corrected image data generation processing transitions to step ST28. In a case where the output timing of the shake-corrected image data is not reached, a negative determination is made, and the shake-corrected image data generation processing transitions to step ST10.

In step ST28, the shake correction portion 62C2 reads out the shake-corrected image data from the memory 64 and outputs the shake-corrected image data to the signal processing portion 50 through the output circuit 62D. Then, the shake-corrected image data generation processing transitions to step ST29.

In step ST29, the shake correction portion 62C2 determines whether or not a condition (hereinafter, referred to as a "shake-corrected image data generation processing finish condition") under which the shake-corrected image data generation processing is finished is satisfied. For example, a condition that an instruction to finish the shake-corrected image data generation processing is received by the reception device 84 (refer to FIG. 4) is exemplified as the shake-corrected image data generation processing finish condition. In step ST29, in a case where the shake-corrected image data generation processing finish condition is not satisfied, a negative determination is made, and the shake-corrected image data generation processing transitions to step ST10. In step ST29, in a case where the shake-corrected image data generation processing finish condition is satisfied, a positive determination is made, and the shake-corrected image data generation processing is finished.

As described above, according to the imaging element 44 according to the first embodiment, the imaging element 44 includes the processing circuit 62 that performs the analog signal processing and the digital signal processing on the analog image data obtained by being captured by the imaging element 44, and the memory 64 that stores the digital image data converted from the analog image data by the processing circuit 62. The processing circuit 62 receives the vibration information indicating the vibration exerted on the imaging element 44 within the frame output period defined by the output frame rate. The processing circuit 62 embeds the pixel line vibration information in the head of the pixel line data of each of a plurality of lines constituting the digital image data and stores the pixel line data in which the pixel line vibration information is embedded in the memory 64. The processing circuit 62 stores the vibration information-embedded image data of four frames in the memory 64 during one frame output period and outputs the vibration information-embedded image data of one frame stored at the end of the frame output period. Thus, according to the present configuration, the vibration information-embedded image data including the vibration information synchronized with the digital image data can be output.

In addition, according to the imaging element 44 according to the first embodiment, the processing circuit 62 embeds the corresponding pixel line vibration information in the pixel line data of each of the plurality of lines. Accordingly, the pixel line data and the vibration information can be accurately synchronized, compared to a case where the pixel line vibration information is not embedded in the pixel line data of each pixel line.

In addition, according to the imaging element 44 according to the first embodiment, the processing circuit 62 embeds the corresponding pixel line vibration information in the head of the pixel line data of the plurality of lines. Accordingly, the pixel line vibration information can be easily extracted from the pixel line data, compared to a case where the pixel line vibration information is not embedded in the head of the pixel line data.

In addition, according to the imaging element 44 according to the first embodiment, the imaging element 44 is an imaging element in which at least the photoelectric conversion element 61 and the memory 64 are formed in one chip. Accordingly, it is possible to contribute to size reduction of the imaging element 44, compared to a case where the photoelectric conversion element 61 and the memory 64 are not formed in one chip.

In addition, according to the imaging element 44 according to the first embodiment, the imaging element 44 is a laminated imaging element in which the photoelectric conversion element 61 and the memory 64 are laminated. Accordingly, a wire that connects the photoelectric conversion element 61 to the memory 64 can be shortened, compared to a case where the photoelectric conversion element 61 and the memory 64 are not laminated. Thus, a wire delay can be reduced, and a transfer speed of the image data can be increased.

In addition, according to the imaging element 44 according to the first embodiment, the shake correction portion 62C2 of the control circuit 62C performs the shake correction processing on the vibration information-embedded image data based on the pixel line vibration information assigned to the vibration information-embedded image data within the frame output period. Accordingly, since the shake correction processing is performed in the imaging element 44, size reduction of the imaging apparatus 10 can be achieved, compared to a case where the shake correction processing is performed by a separate rear stage circuit.

In addition, according to the imaging element 44 according to the first embodiment, the shake correction portion 62C2 performs the shake correction processing using the average value of the pixel line vibration information. Accordingly, the shake correction processing can be accurately performed, compared to a case of not using the average value of the pixel line vibration information.

In the first embodiment, while the angular velocity is used as the vibration information, the technology of the present disclosure is not limited thereto. The vibration information may be at least one of an acceleration, an integrated value of an angle, an integrated value of an acceleration, or a shake correction amount. Accordingly, optimal vibration information can be embedded in accordance with specifications of the shake correction processing, compared to a case where the vibration information is a value of one type.

In addition, in the first embodiment, while the vibration information embedding portion 62C1 embeds the pixel line vibration information in the head of each pixel line data, the technology of the present disclosure is not limited thereto. The bit region for embedding the pixel line vibration information may be prepared in advance in a tail of the pixel line data, and the vibration information embedding portion 62C1 may embed the pixel line vibration information in the tail of each pixel line data. Even in this case, the same effect as in a case of embedding the pixel line vibration information in the head of each pixel line data is obtained.

In addition, in the first embodiment, while the bit region for embedding the pixel line vibration information is set in the head of the pixel line data of each of the plurality of lines, the technology of the present disclosure is not limited thereto. The bit region for embedding the pixel line vibration information may be set in the head of the pixel line data of at least one line in the pixel line data of the plurality of lines. Even in this case, the pixel line data and the vibration information can be accurately synchronized, compared to a case where the vibration information is not embedded in the pixel line data of at least one pixel line.

In addition, in the first embodiment, while the shake correction portion 62C2 performs the shake correction processing using the average value of the vibration information, the technology of the present disclosure is not limited thereto. The shake correction portion 62C2 may perform the shake correction processing using a median value or a mode value of the vibration information instead of the average value of the vibration information. Even in this case, the same effect as in a case of performing the shake correction processing using the average value of the pixel line vibration information is obtained.

In addition, in the first embodiment, while each pixel line is composed of a horizontal pixel line consisting of one line, the technology of the present disclosure is not limited thereto. Each pixel line may be composed of a horizontal pixel line consisting of a plurality of lines.

In addition, in the first embodiment, while the vibration sensor 47 acquires the vibration information in units of horizontal pixel lines at the center of the predetermined exposure period, the technology of the present disclosure is not limited thereto. The vibration sensor 47 may asynchronously acquire the vibration information with the exposure period of each pixel line. In this case, the vibration information embedding portion 62C1 may embed the vibration information in the head of the pixel line data for a pixel line that is exposed within a period closest to a period in which the vibration information is acquired. In this case, the vibration information can be embedded in the pixel line data for which an acquisition period of the vibration information and the exposure period of the pixel line are accurately matched, compared to a case where the vibration information is not embedded in the pixel line data for the pixel line having an exposure period closest to the acquisition period of the vibration information. The exposure period of each pixel line and the acquisition period of the vibration information are asynchronous. Thus, in this case, the vibration information may not be embedded in all pixel line data.

Second Embodiment

As illustrated in FIG. 11 as an example, in the imaging apparatus 10 according to a second embodiment, the user designates a region in which the shake correction processing is accurately performed, by bringing the instruction object such as the finger or the stylus pen into contact with a partial region of the live view image displayed on the touch panel display 26. The controller 46 outputs partial region designation information to the imaging element 44. The partial region designation information is information indicating a position of the partial region designated by the user through the touch panel 34 in the digital image data displayed on the display 32 as the live view image. For example, the partial region designation information is coordinates of at least one pixel constituting the partial region. For example, in a case where an upper left pixel of an image indicated by the digital image data is set as an origin, the partial region designation information is coordinates (X, Y) of the pixel designated by the user (refer to FIG. 14). The imaging element 44 performs the shake correction processing based on the pixel line vibration information acquired during the exposure of the pixel line corresponding to the position of the partial region indicated by the partial region designation information.

A configuration of the imaging element 44 according to the second embodiment is the same as the imaging element 44 according to the first embodiment. Thus, the same constituents as the constituents described in the first embodiment will be designated by the same reference numerals and will not be described.

Figure 12:
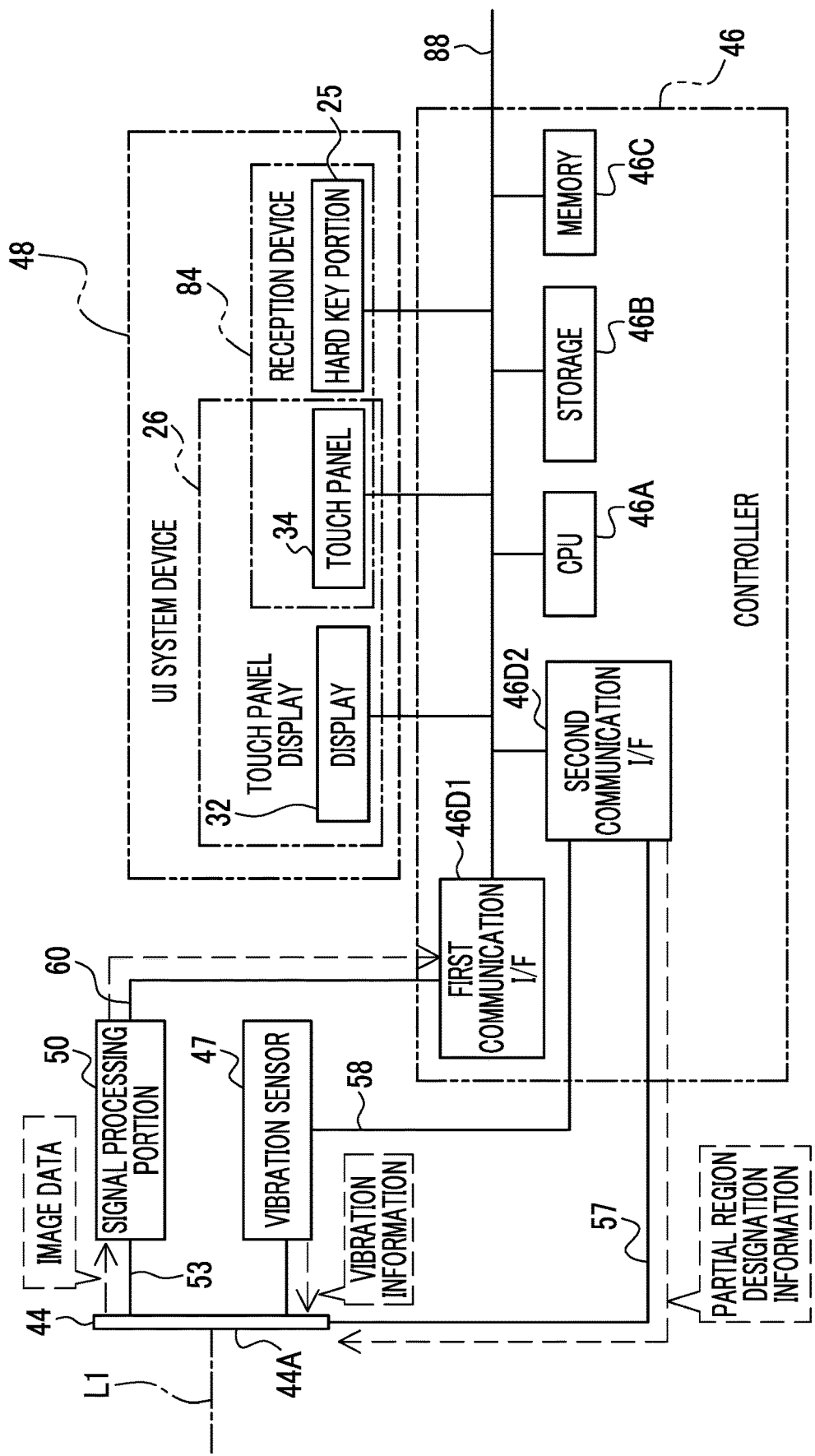
FIG. 12 is a block diagram illustrating an example of an electric configuration of an imaging apparatus main body according to the second embodiment.

As illustrated in FIG. 12 as an example, in the imaging apparatus 10 according to the second embodiment, in the recording imaging mode, the digital image data acquired by the processing circuit 62 is output to the signal processing portion 50 through the output circuit 62D at the output frame rate. The signal processing portion 50 performs the various types of signal processing on the digital image data and outputs the digital image data on which the various types of signal processing are performed to the CPU 46A through the first communication I/F 46D1. The CPU 46A displays the input digital image data on the touch panel display 26 as the live view image.

The user decides an angle of view by viewing the live view image displayed on the touch panel display 26 and comes into contact with the partial region of the live view image using the instruction object (refer to FIG. 11). A region that is to be particularly clearly captured in a specific subject displayed in the live view image is selected as the partial region. For example, in a case where the specific subject is a person, a region including a face of the person is selected as the partial region.

The touch panel 34 senses the contact with the partial region of the live view image displayed on the display 32. The touch panel 34 outputs information for specifying a position of the sensed contact to the CPU 46A as the partial region designation information. The CPU 46A outputs the partial region designation information to the imaging element 44 through the second communication I/F 46D2.

Figure 13:
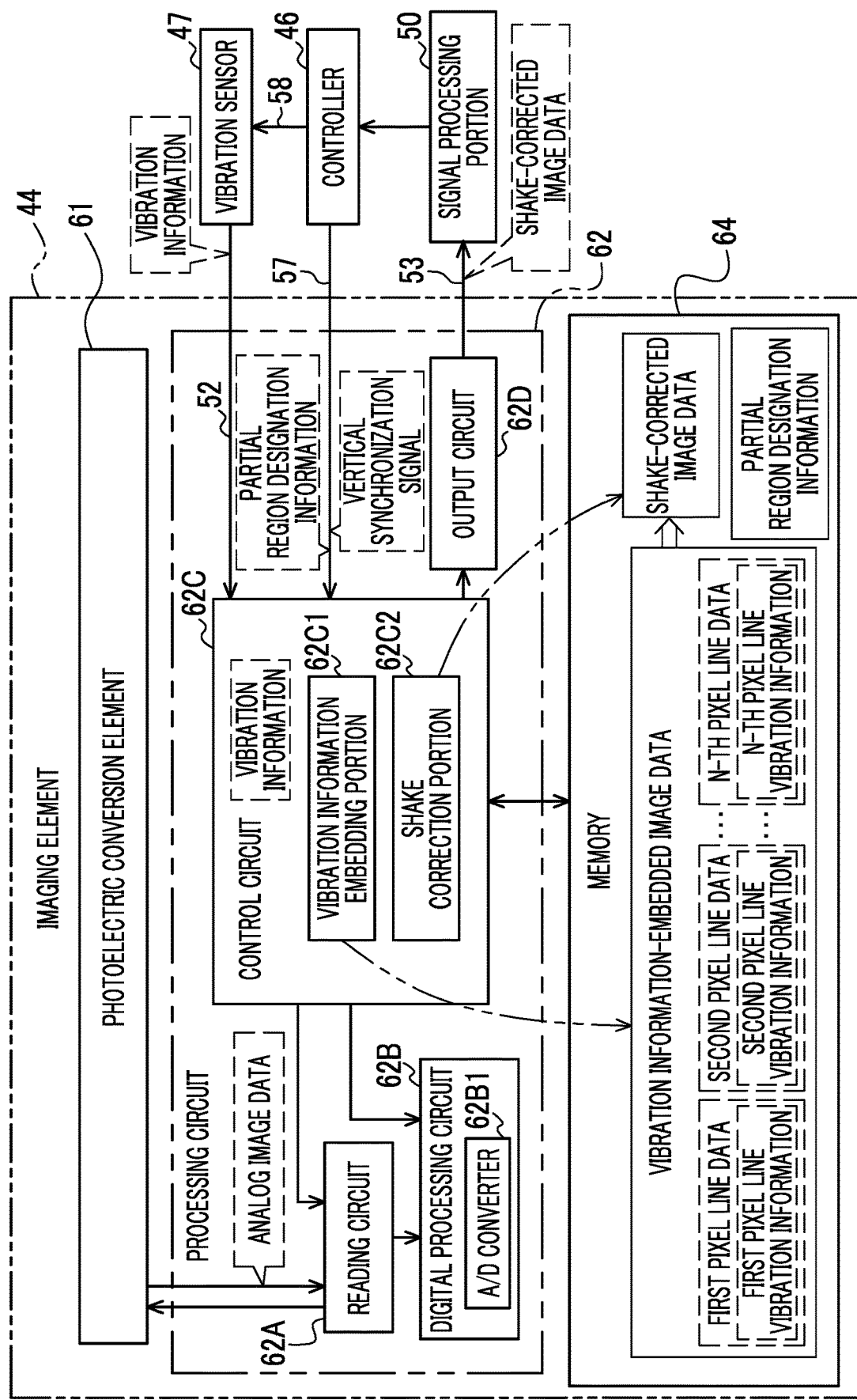
FIG. 13 is a block diagram illustrating an example of a configuration of an electric system of the imaging element included in the imaging apparatus according to the second embodiment.

As illustrated in FIG. 13 as an example, the control circuit 62C receives the partial region designation information input from the controller 46 and stores the partial region designation information in the memory 64.

Then, the user causes the imaging apparatus 10 to perform imaging with the decided angle of view. The processing circuit 62 performs imaging at the imaging frame rate and acquires the digital image data in units of horizontal pixel lines as in the first embodiment. Furthermore, the control circuit 62C receives the vibration information indicating the vibration exerted on the imaging element 44 in units of horizontal pixel lines. The vibration information embedding portion 62C1 embeds the pixel line vibration information in the head of the pixel line data of each of the plurality of lines constituting the digital image data. The vibration information embedding portion 62C1 sequentially stores the pixel line data in which the pixel line vibration information is embedded in the memory 64.

In a case where all pixel line data are stored in the memory 64, the shake correction portion 62C2 reads out the vibration information-embedded image data of one frame and the partial region designation information from the memory 64. The shake correction portion 62C2 specifies the pixel line corresponding to the partial region designated by the user based on the Y coordinate of the coordinates (X, Y) included in the partial region designation information.

Figure 14:
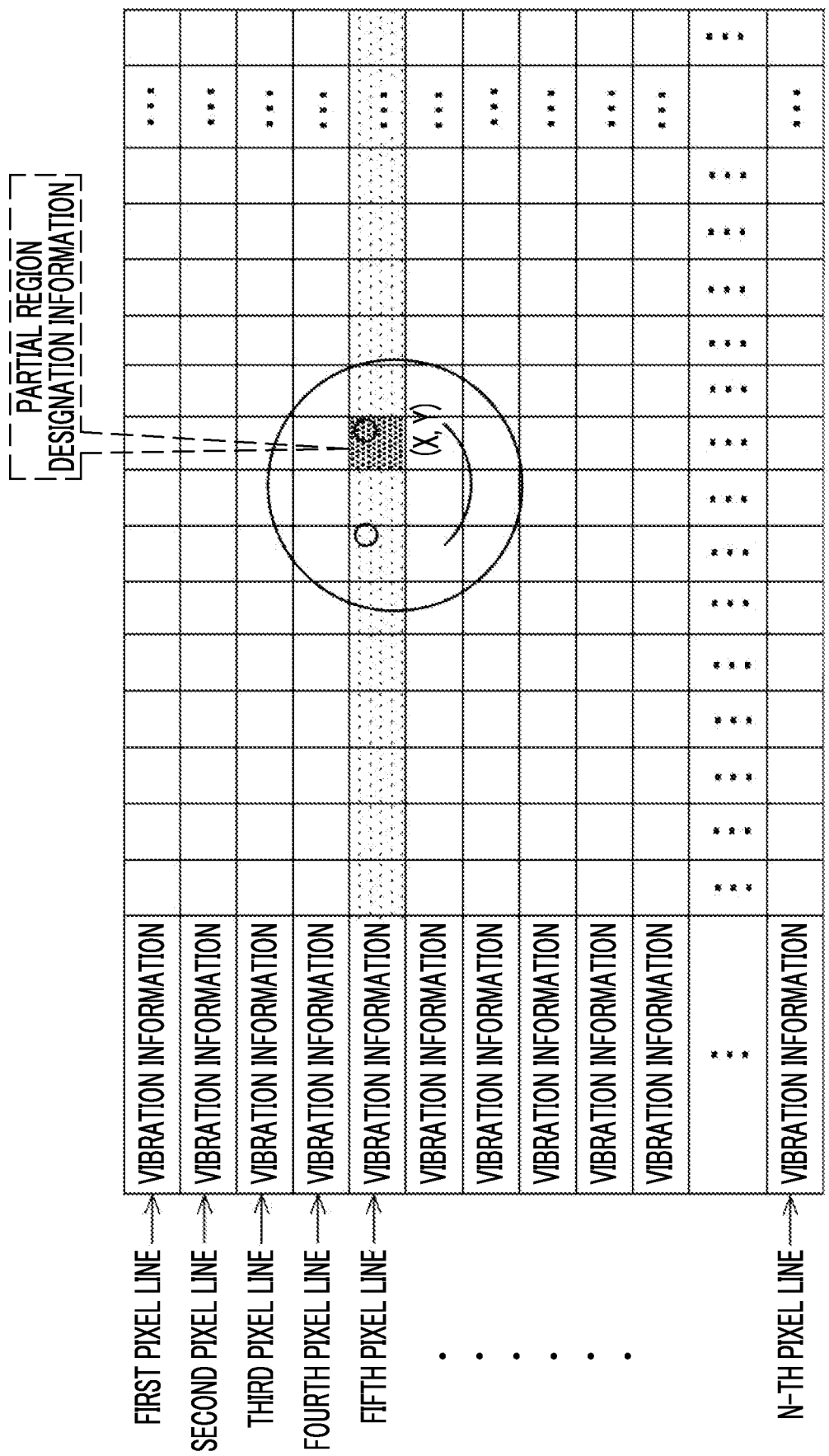
FIG. 14 is a conceptual diagram for describing a pixel line including a partial region indicated by the partial region designation information in vibration information-embedded image data generated by the imaging element included in the imaging apparatus according to the second embodiment.

As illustrated in FIG. 14 as an example, in a case where the coordinates (X, Y) included in the partial region designation information correspond to the fifth pixel line of the vibration information-embedded image data, the shake correction portion 62C2 reads out the fifth pixel line vibration information embedded in the head of the fifth pixel line data. Here, the fifth pixel line vibration information is the vibration information acquired by the vibration sensor 47 within the exposure period of the fifth pixel line corresponding to the partial region designated by the user. The shake correction portion 62C2 performs the shake correction processing on the vibration information-embedded image data based on the fifth pixel line vibration information and stores the shake-corrected image data generated by the shake correction processing in the memory 64.

Figure 15:
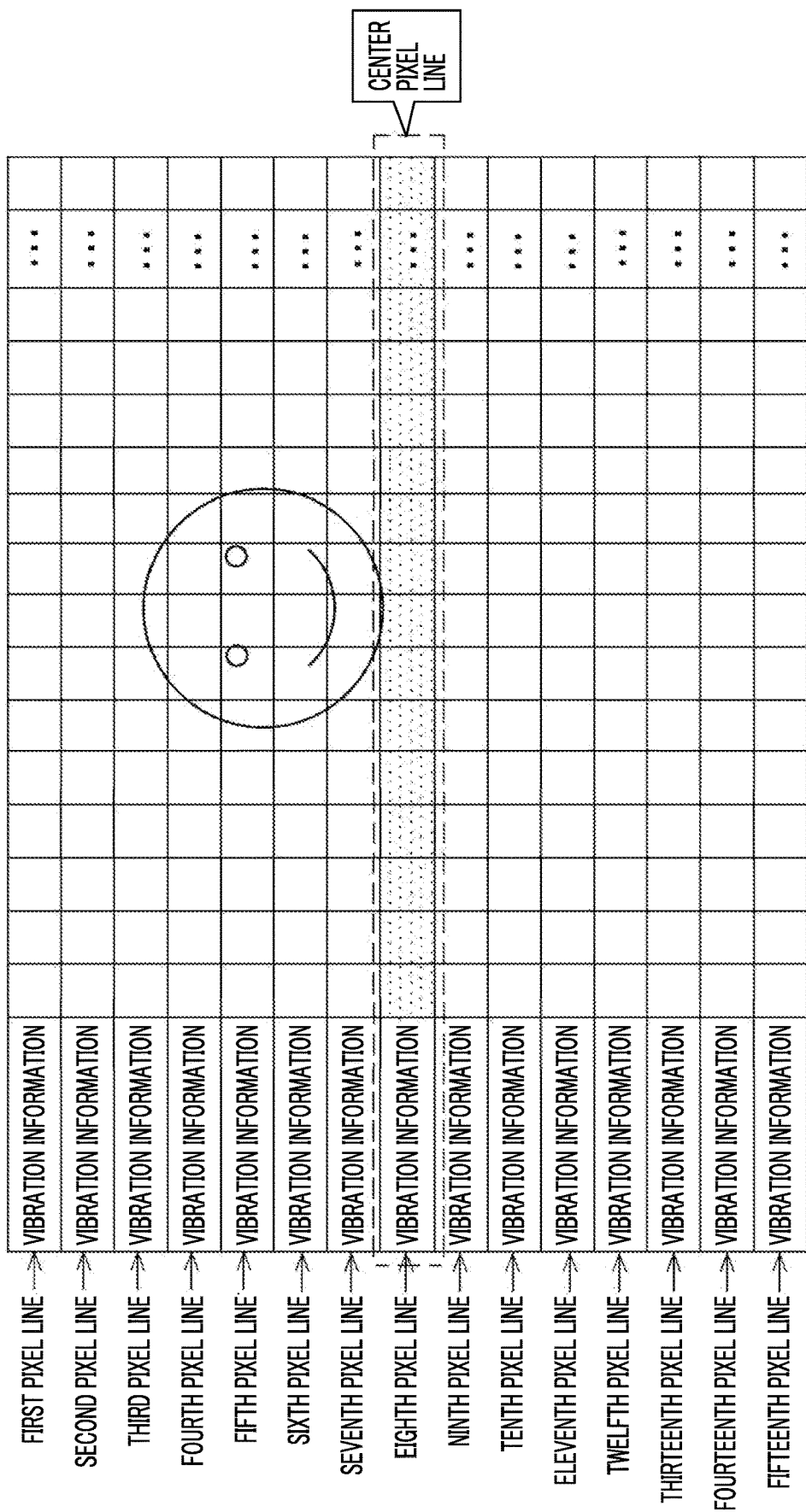
FIG. 15 is a conceptual diagram for describing a center pixel line in the vibration information-embedded image data generated by the imaging element included in the imaging apparatus according to the second embodiment.

In the second embodiment, while the user designates the partial region before performing imaging, the partial region may not be designated by the user. In this case, as illustrated in FIG. 15 as an example, the control circuit 62C specifies a center pixel line positioned at a center of the imaging element 44 among the plurality of pixel lines included in the imaging element 44. In the example illustrated in FIG. 15, the digital image data of one frame is composed of the pixel line data of 15 lines including the first pixel line data to the fifteenth pixel line data. Thus, the eighth pixel line is specified as the center pixel line. The control circuit 62C reads out the eighth pixel line vibration information embedded in the head of the eighth pixel line data. Here, the eighth pixel line data is the vibration information acquired by the vibration sensor 47 during the exposure period of the eighth pixel line that is the center pixel line.

The shake correction portion 62C2 performs the shake correction processing on the vibration information-embedded image data based on the eighth pixel line vibration information and stores the shake-corrected image data generated by the shake correction processing in the memory 64.

Next, an action of the imaging element 44 according to the second embodiment will be described. The shake-corrected image data generation processing executed within the frame output period by the processing circuit 62 of the imaging element 44 will be described with reference to FIG. 10A and FIG. 16.

Figure 16:
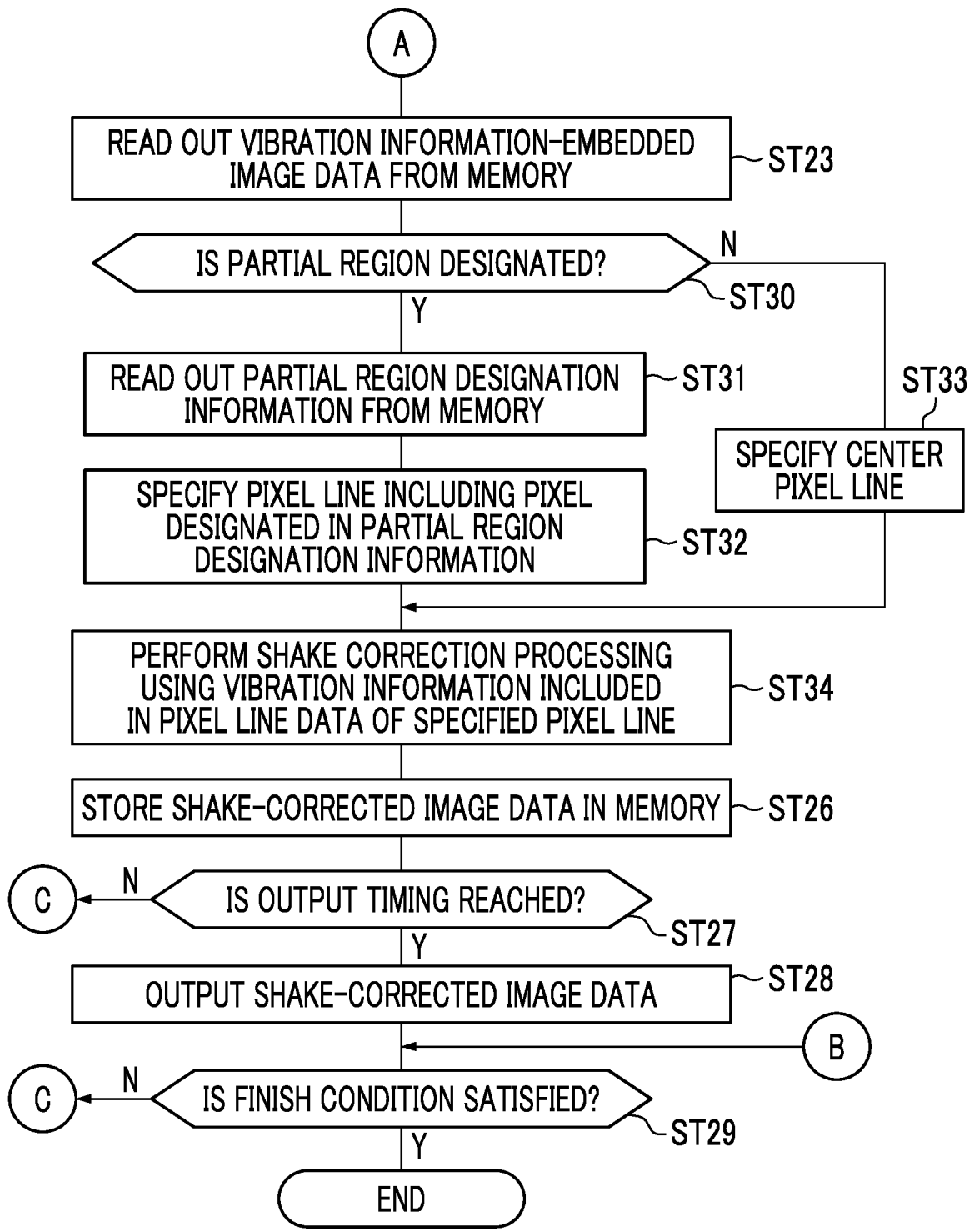
FIG. 16 is a flowchart illustrating an example of a flow of shake-corrected image data generation processing according to the second embodiment.

Processing of step ST10 to step ST22 included in the shake-corrected image data generation processing illustrated in FIG. 10A is the same as the processing described in the first embodiment and thus, will not be described. In addition, processing of step ST23 and processing of step ST26 to step ST29 included in the shake-corrected image data generation processing illustrated in FIG. 16 are the same as the processing described in the first embodiment and thus, will not be described. Hereinafter, only differences from the first embodiment will be described.

In step ST30 illustrated in FIG. 16, the shake correction portion 62C2 determines whether or not the partial region is designated by the user. In a case where the partial region is designated, the partial region designation information is stored in the memory 64. Thus, the control circuit 62C can determine whether or not the partial region is designated by checking presence or absence of the partial region designation information. In step ST30, in a case where the partial region is designated, a positive determination is made, and the shake-corrected image data generation processing transitions to step ST31. In step ST30, in a case where the partial region is not designated, a negative determination is made, and the shake-corrected image data generation processing transitions to step ST33.

In step ST31, the shake correction portion 62C2 reads out the partial region designation information from the memory 64. Then, the shake-corrected image data generation processing transitions to step ST32.

In step ST32, the shake correction portion 62C2 specifies the pixel line including the pixel designated in the partial region designation information. For example, the partial region designation information is the coordinates (X, Y) of the pixel designated by the user. The shake correction portion 62C2 specifies the pixel line corresponding to the partial region designated by the user based on the Y coordinate of the coordinates (X, Y). Then, the shake-corrected image data generation processing transitions to step ST34.

Meanwhile, in step ST33, the shake correction portion 62C2 specifies the center pixel line positioned at the center of the imaging element 44. Then, the shake-corrected image data generation processing transitions to step ST34.

In step ST34, the shake correction portion 62C2 performs the shake correction processing on the vibration information-embedded image data using the pixel line vibration information included in the pixel line data of the specified pixel line. That is, in a case where the partial region is designated in step ST30, the pixel line including the pixel designated in the partial region designation information is specified in step ST32. Accordingly, the shake correction portion 62C2 performs the shake correction processing using the pixel line vibration information included in the pixel line data of the pixel line including the pixel designated in the partial region designation information. Meanwhile, in a case where the partial region is not designated in step ST30, the center pixel line is specified in step ST33. Accordingly, the shake correction portion 62C2 performs the shake correction processing using the pixel line vibration information included in the pixel line data of the center pixel line. Then, the shake-corrected image data generation processing transitions to step ST26.

As described above, according to the imaging element 44 according to the second embodiment, the control circuit 62C receives the partial region designation information for designating the partial region of the digital image data. The control circuit 62C reads out the pixel line vibration information embedded in the head of the pixel line data of the pixel line corresponding to the partial region among the plurality of pixel lines included in the imaging element 44, and uses the pixel line vibration information in the shake correction processing. The pixel line vibration information used in the shake correction processing is the pixel line vibration information acquired by the vibration sensor 47 within the exposure period of the pixel line corresponding to the partial region. Accordingly, the shake correction processing can be performed based on the pixel line vibration information corresponding to the pixel line intended by the user among the plurality of pixel lines included in the imaging element 44.

In addition, according to the imaging element 44 according to the second embodiment, in a case where the partial region designation information is not received, the control circuit 62C receives the pixel line vibration information within the exposure period of the center pixel line positioned at the center of the imaging element 44 among the plurality of pixel lines included in the imaging element 44. The control circuit 62C reads out the pixel line vibration information embedded in the head of the pixel line data of the center pixel line and uses the pixel line vibration information in the shake correction processing. Accordingly, the vibration information and the digital image data can be accurately synchronized, compared to a case where the pixel line vibration information within the exposure period of the center pixel line is not received.

In the second embodiment, while the partial region designation information is the coordinates (X, Y) of at least one pixel constituting the partial region, the technology of the present disclosure is not limited thereto. The partial region designation information may be the number of pixels in each of an X axis direction and a Y axis direction from the upper left pixel of the image indicated by the digital image data to at least one pixel constituting the partial region.

In addition, in the second embodiment, while the partial region designation information is represented by setting the upper left pixel of the image indicated by the digital image data as the origin, the technology of the present disclosure is not limited thereto. Another pixel of the image may be set as the origin. In addition, a pixel at a center of the image may be set as the origin.

In addition, in the second embodiment, while one pixel is designated as the partial region, the technology of the present disclosure is not limited thereto. The partial region may include two or more pixels. Consequently, in a case where a plurality of pixel lines correspond to the partial region, the shake correction portion 62C2 may perform the shake correction processing on the vibration information-embedded image data using the average value, the median value, or the mode value of the pixel line vibration information included in the pixel line data of the plurality of pixel lines corresponding to the partial region.

Third Embodiment

Figure 17:
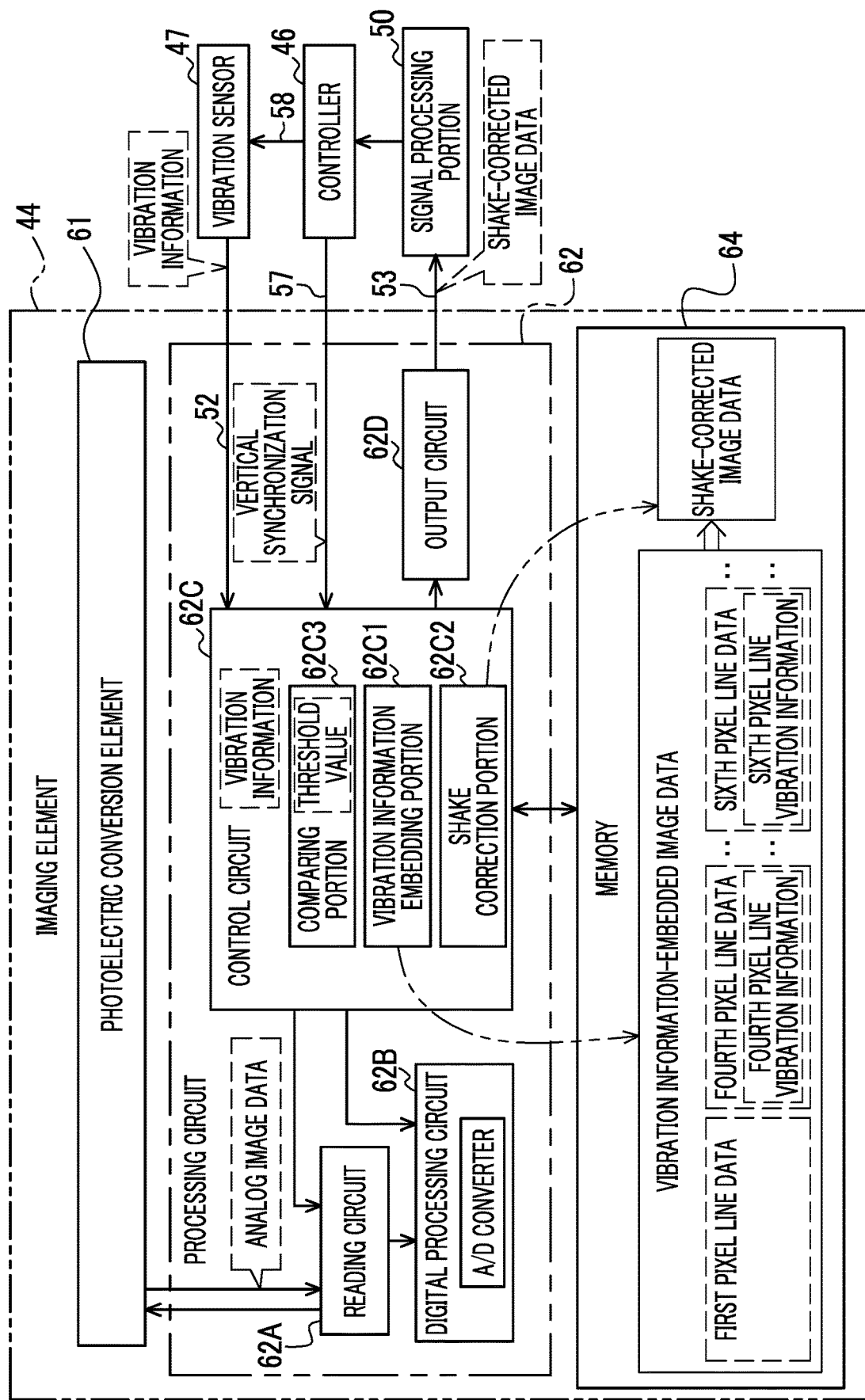
FIG. 17 is a block diagram illustrating an example of a configuration of an electric system of the imaging element included in the imaging apparatus according to the third embodiment.

As illustrated in FIG. 17 as an example, in the imaging element 44 according to a third embodiment, the control circuit 62C includes a comparing portion 62C3. The comparing portion 62C3 decides whether or not to embed the vibration information in the pixel line data in accordance with a value of the vibration information. Other configurations of the imaging element 44 according to the third embodiment are the same as the imaging element 44 according to the first embodiment. Thus, the same constituents as the constituents described in the first embodiment will be designated by the same reference numerals and will not be described.

The comparing portion 62C3 has a predetermined threshold value to be compared with the vibration information. The threshold value may be a fixed value or a variable value. In the third embodiment, since the vibration information is the angular velocity indicating the vibration exerted on the imaging element 44, the threshold value for the angular velocity is set in advance in the comparing portion 62C3. In addition, as an optical zoom magnification of the imaging apparatus 10 is increased, the shake of the image data caused by the vibration exerted on the imaging element 44 is increased. Thus, the threshold value may be decided in accordance with the optical zoom magnification of the imaging apparatus 10.

Figure 18:
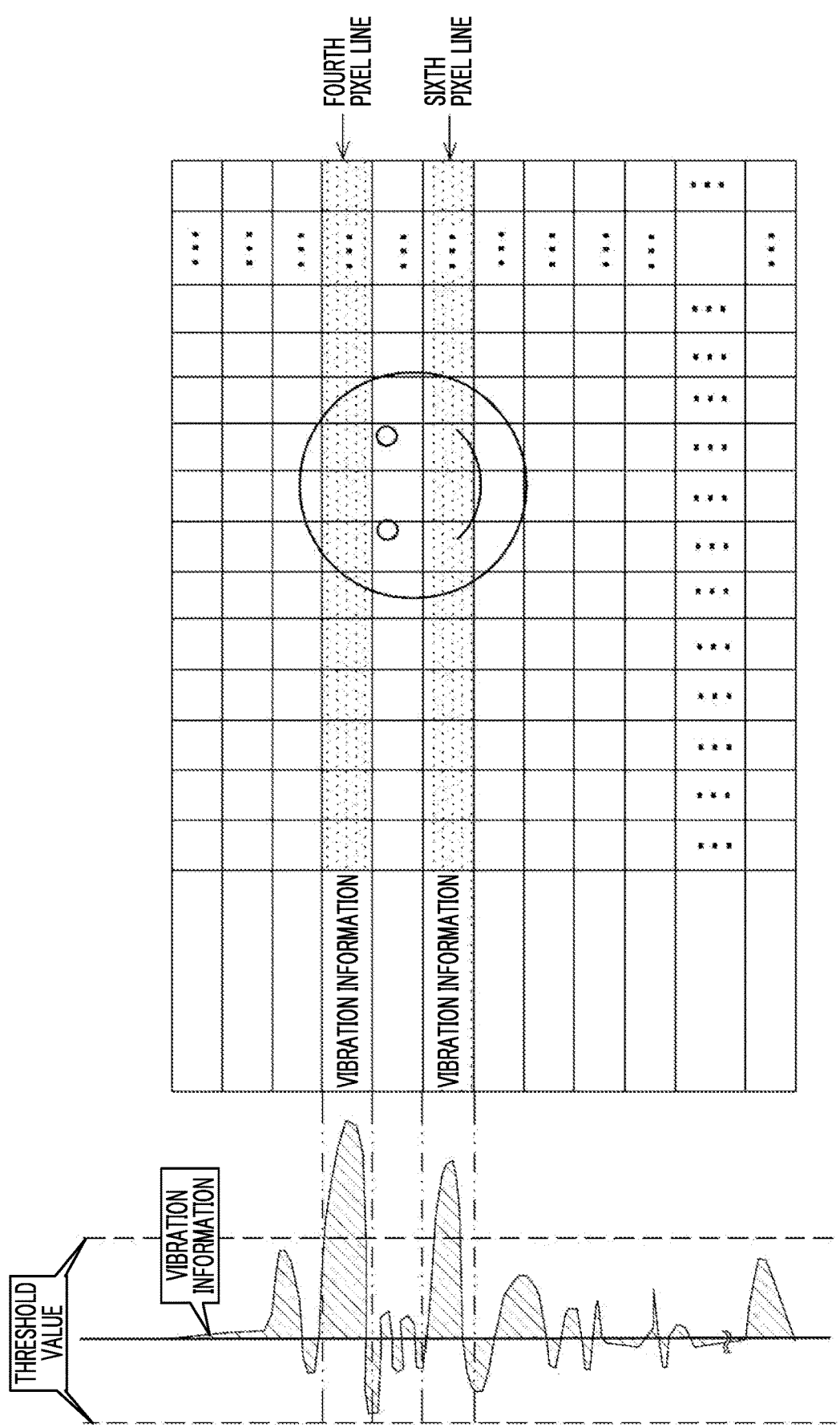
FIG. 18 is a conceptual diagram for describing vibration information-embedded image data generated by the imaging element included in the imaging apparatus according to the third embodiment.

As illustrated in FIG. 18 as an example, the threshold value is an absolute value including a positive value and a negative value. The comparing portion 62C3 acquires the vibration information detected by the vibration sensor 47. The comparing portion 62C3 compares the acquired vibration information with the threshold value in units of horizontal pixel lines. In a case where the vibration information exceeds the threshold value, the comparing portion 62C3 outputs the vibration information to the vibration information embedding portion 62C1. The vibration information embedding portion 62C1 embeds the vibration information input from the comparing portion 62C3 in the corresponding pixel line data.

In the example illustrated in FIG. 18, the comparing portion 62C3 compares the vibration information with the threshold value in units of horizontal pixel lines. The first pixel line vibration information to the third pixel line vibration information acquired by the vibration sensor 47 during the exposure of the first pixel line to the third pixel line are less than the threshold value. In this case, the comparing portion 62C3 determines that the pixel line vibration information is less than the threshold value, and does not output the pixel line vibration information to the vibration information embedding portion 62C1.

Meanwhile, the fourth pixel line vibration information that is the vibration information acquired by the vibration sensor 47 during the exposure of the fourth pixel line is greater than the threshold value. The comparing portion 62C3 determines that the fourth pixel line vibration information is greater than the threshold value, and outputs the fourth pixel line vibration information to the vibration information embedding portion 62C1. The vibration information embedding portion 62C1 embeds the input fourth pixel line vibration information in the fourth pixel line data and stores the fourth pixel line data in which the fourth pixel line vibration information is embedded in the corresponding storage region of the memory 64.

Similarly, the sixth pixel line vibration information that is the vibration information acquired by the vibration sensor 47 during the exposure of the sixth pixel line is also greater than the threshold value. The comparing portion 62C3 determines that the sixth pixel line vibration information is greater than the threshold value, and outputs the sixth pixel line vibration information to the vibration information embedding portion 62C1. The vibration information embedding portion 62C1 embeds the input sixth pixel line vibration information in the sixth pixel line data and stores the sixth pixel line data in which the sixth pixel line vibration information is embedded in the corresponding storage region of the memory 64.

Accordingly, in the vibration information-embedded image data according to the third embodiment, the pixel line vibration information is embedded in only the pixel line data of the pixel line for which the vibration information greater than the threshold value is acquired during the exposure.

In a case where the comparing portion 62C3 compares the vibration information with the threshold value for all pixel lines, and the vibration information embedding portion 62C1 stores the pixel line data in which the vibration information greater than the threshold value is embedded in the memory 64, the shake correction portion 62C2 reads out the vibration information-embedded image data of one frame from the memory 64. The shake correction portion 62C2 calculates the average value of the pixel line vibration information embedded in the vibration information-embedded image data and performs the shake correction processing on the vibration information-embedded image data using the average value. The shake correction portion 62C2 stores the shake-corrected image data generated by the shake correction processing in the memory 64.

Next, an action of the imaging element 44 according to the third embodiment will be described. Here, the shake-corrected image data generation processing executed within the frame output period by the processing circuit 62 of the imaging element 44 will be described with reference to FIG. 19 and FIG. 10B.

Figure 19:
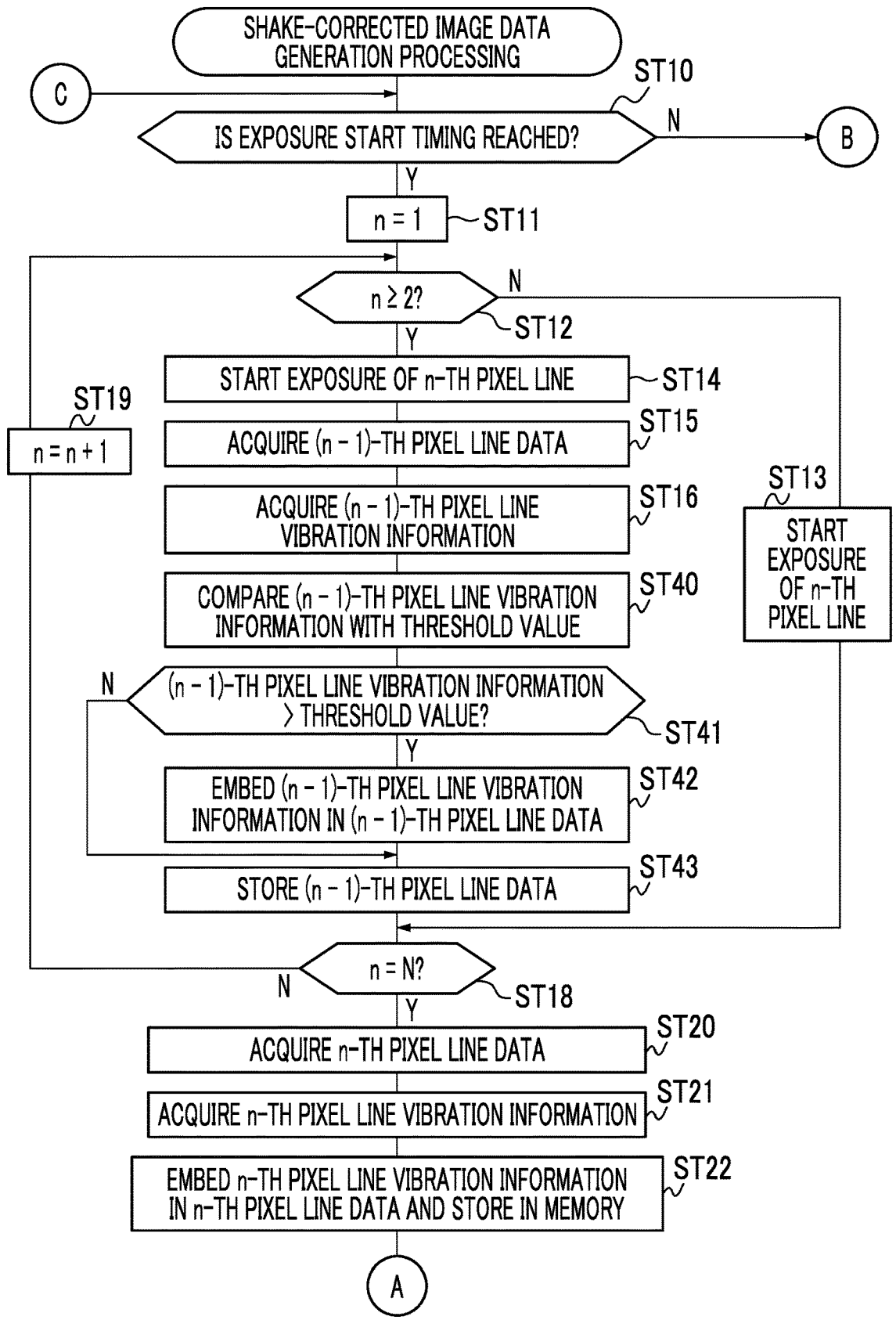
FIG. 19 is a flowchart illustrating an example of a flow of shake-corrected image data generation processing according to the third embodiment.

Processing of step ST10 to step ST16 and processing of step ST18 to step ST22 included in the shake-corrected image data generation processing illustrated in FIG. 19 are the same as the processing illustrated in FIG. 10A and described in the first embodiment and thus, will not be described. In addition, processing of step ST23 to step ST29 included in the shake-corrected image data generation processing illustrated in FIG. 10B is the same as the processing described in the first embodiment and thus, will not be described. Hereinafter, only differences from the first embodiment will be described.

In step ST40, the comparing portion 62C3 compares the (n−1)-th pixel line vibration information with the threshold value. Then, the shake-corrected image data generation processing transitions to step ST41.

In step ST41, the comparing portion 62C3 determines whether or not the (n−1)-th pixel line vibration information is greater than the threshold value. In step ST41, in a case where the (n−1)-th pixel line vibration information is greater than the threshold value, a positive determination is made, and the shake-corrected image data generation processing transitions to step ST42. In step ST41, in a case where the (n−1)-th pixel line vibration information is less than or equal to the threshold value, a negative determination is made, and the shake-corrected image data generation processing transitions to step ST43.

In step ST42, the comparing portion 62C3 outputs the (n−1)-th pixel line vibration information to the vibration information embedding portion 62C1. The vibration information embedding portion 62C1 embeds the input (n−1)-th pixel line vibration information in the (n−1)-th pixel line data. Then, the shake-corrected image data generation processing transitions to step ST43.

In step ST43, the vibration information embedding portion 62C1 stores the (n−1)-th pixel line data in the memory 64. Then, the shake-corrected image data generation processing transitions to step ST18.

As described above, according to the imaging element 44 according to the third embodiment, the control circuit 62C decides whether or not to embed the vibration information in the digital image data in accordance with the value of the vibration information. Accordingly, a processing load for embedding the vibration information can be reduced, compared to a case where the vibration information is embedded in the digital image data at all times.

In addition, according to the imaging element 44 according to the third embodiment, in a case where the vibration information exceeds the predetermined threshold value, the control circuit 62C embeds the vibration information in the corresponding pixel line data. Accordingly, since only the vibration information exceeding the threshold value is embedded in the pixel line data, the processing load for embedding the vibration information can be reduced, compared to a case where the vibration information is embedded in the pixel line data of all pixel lines.

In the third embodiment, while the vibration information is illustrated as continuous analog data in FIG. 18, the technology of the present disclosure is not limited thereto. The vibration sensor 47 may acquire one or a plurality of values of the vibration information for each horizontal pixel line in synchronization with the exposure time period of the pixel line, and the comparing portion 62C3 may compare the acquired values of the vibration information with the threshold value.

In addition, in the third embodiment, while the threshold value is a value with respect to the angular velocity exerted on the imaging element 44, the technology of the present disclosure is not limited thereto. In a case where the acceleration, the integrated value of the angle, the integrated value of the acceleration, or the shake correction amount is employed as the vibration information, a value corresponding to each type is set as the threshold value.

Fourth Embodiment

Figure 20:
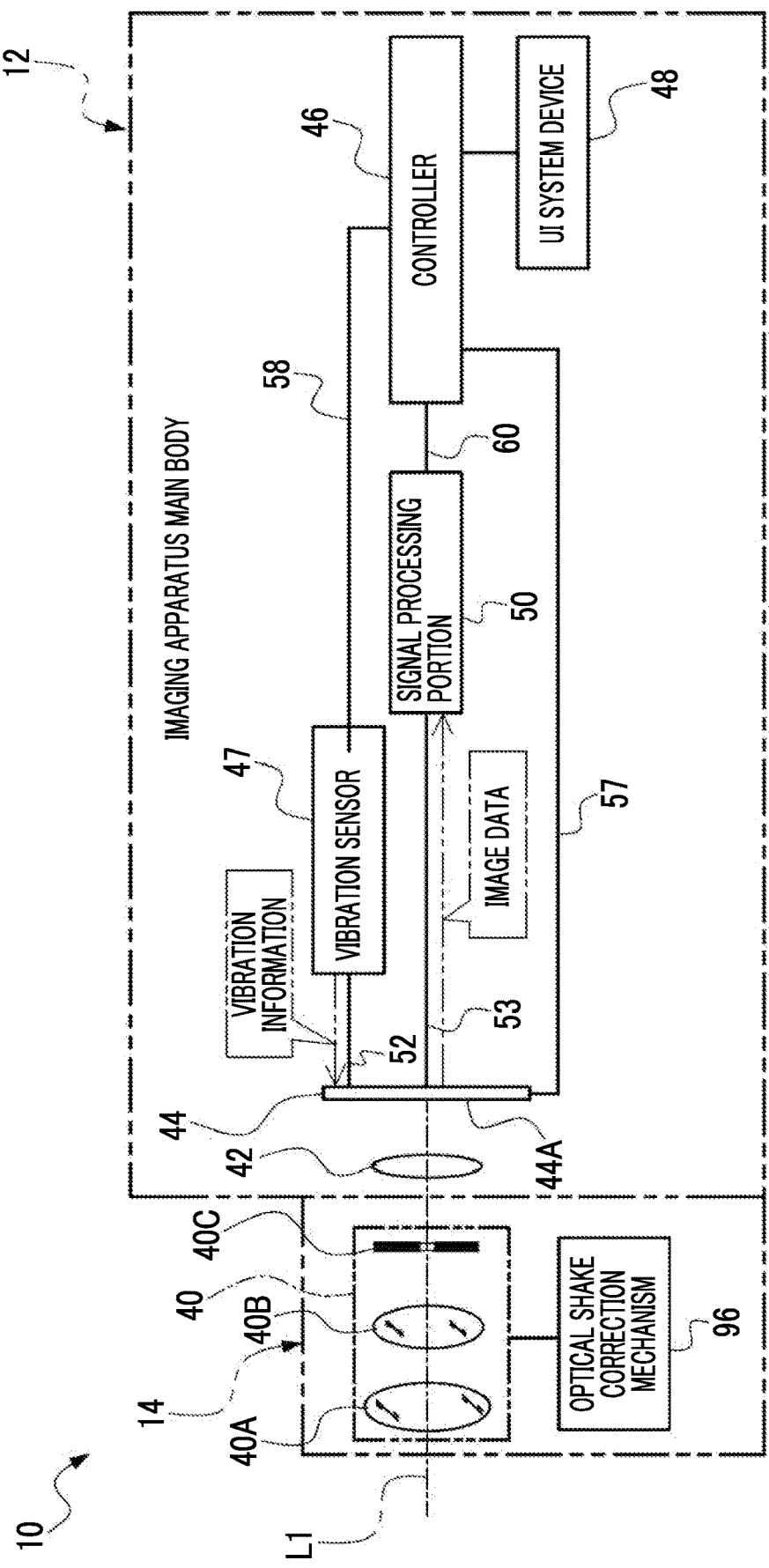
FIG. 20 is a block diagram illustrating an example of a configuration of the imaging apparatus according to the fourth embodiment.

As illustrated in FIG. 20 as an example, the imaging apparatus 10 according to a fourth embodiment comprises an optical shake correction mechanism 96. The optical shake correction mechanism 96 corrects the shake of the image obtained by being captured by the imaging apparatus 10 by displacing the imaging lens 40 in a direction in which the vibration exerted on the imaging apparatus 10 is canceled out. Here, a so-called OIS is employed as the optical shake correction mechanism 96. Other configurations of the imaging apparatus 10 according to the fourth embodiment are the same as the imaging apparatus 10 according to the first embodiment. Thus, the same constituents as the constituents described in the first embodiment will be designated by the same reference numerals and will not be described.

Figure 21:
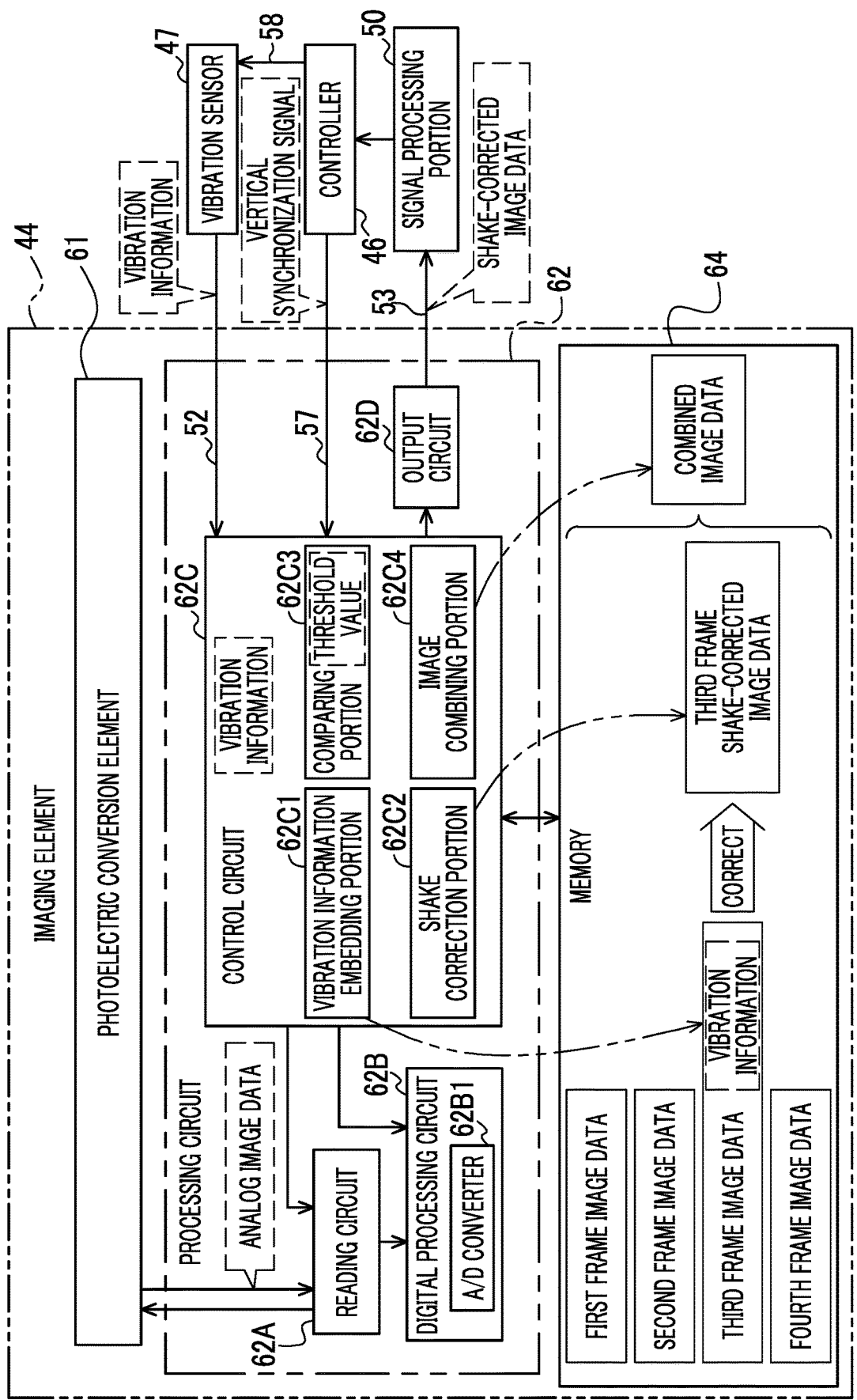
FIG. 21 is a block diagram illustrating an example of a configuration of an electric system of the imaging element included in the imaging apparatus according to the fourth embodiment.

As illustrated in FIG. 21 as an example, the imaging element 44 according to the fourth embodiment is different from the imaging element 44 according to the first embodiment in that the comparing portion 62C3 and an image combining portion 62C4 are comprised in the control circuit 62C. Other configurations of the imaging element 44 according to the fourth embodiment are the same as the imaging element 44 according to the first embodiment. Thus, the same constituents as the constituents described in the first embodiment will be designated by the same reference numerals and will not be described.

In the imaging element 44 according to the fourth embodiment, in the still picture image recording imaging mode, the processing circuit 62 acquires the image data of the plurality of frames at a high-speed imaging frame rate higher than the output frame rate. The processing circuit 62 performs the image data processing including the shake correction processing on the image data of each of the plurality of frames and then, generates the image data of one frame having a necessary exposure amount by combining the image data of the plurality of frames. In the example illustrated in FIG. 21, combined image data of one frame is generated by combining the image data of four frames. Thus, the high-speed imaging frame rate is set to ¼ of the imaging frame rate in a case of generating the image data of one frame having a standard exposure amount. Here, the high-speed imaging frame rate is an example of a "second frame rate" according to the embodiments of the technology of the present disclosure.

The control circuit 62C performs the image data processing. As will be described in detail later, the image data processing includes acquisition processing, reception processing, generation processing, and the shake correction processing. Here, the acquisition processing is an example of "acquisition processing" according to the embodiments of the technology of the present disclosure. The reception processing is an example of "reception processing" according to the embodiments of the technology of the present disclosure. The generation processing is an example of "generation processing" according to the embodiments of the technology of the present disclosure. The shake correction processing is an example of "shake correction processing" according to the embodiments of the technology of the present disclosure.

The acquisition processing is processing of acquiring the digital image data from the digital processing circuit 62B. The reception processing is processing of receiving the vibration information input from the vibration sensor 47 in units of frames. The generation processing is processing of generating the vibration information-embedded image data by embedding the input vibration information in the image data. The shake correction processing is processing of performing shake correction on the embedded image data based on the vibration information.

The comparing portion 62C3 has the predetermined threshold value. The comparing portion 62C3 compares the input vibration information with the threshold value. In the fourth embodiment, since the vibration information is the angular velocity indicating the vibration exerted on the imaging element 44, the threshold value for the angular velocity is set in advance in the comparing portion 62C3. In addition, as illustrated in FIG. 22 as an example, the threshold value is an absolute value including a positive value and a negative value.

Figure 22:
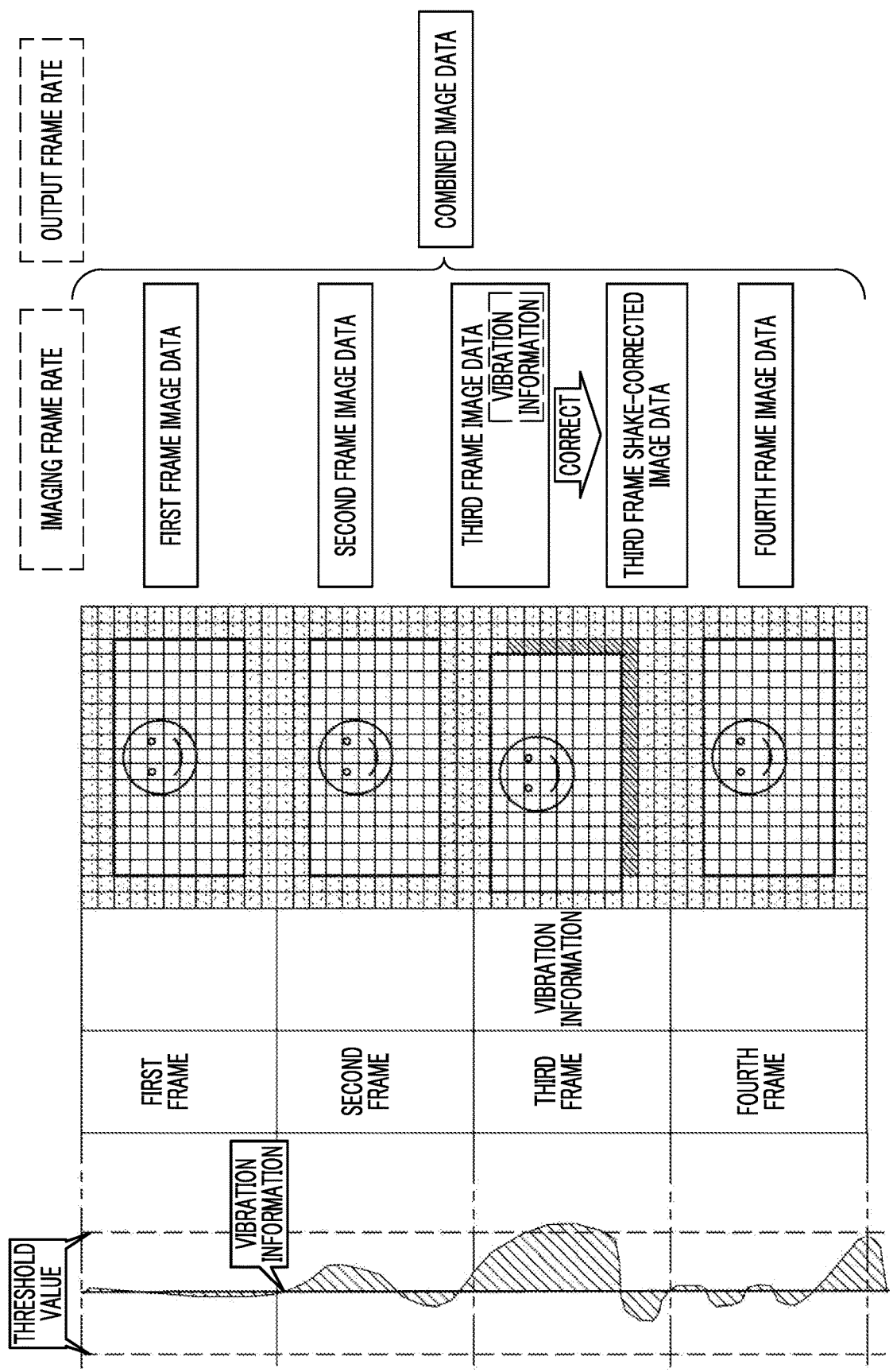
FIG. 22 is a conceptual diagram for describing an example of a flow of combined image data generation processing according to the fourth embodiment.

In the example illustrated in FIG. 22 as an example, the input vibration information is less than the threshold value in the first, second, and fourth frames. In this case, the comparing portion 62C3 does not output the vibration information to the vibration information embedding portion 62C1. The vibration information embedding portion 62C1 stores the digital image data of the first, second, and fourth frames in the memory 64 as the first, second, and fourth frame image data without embedding the corresponding vibration information.

In the example illustrated in FIG. 22, a large vibration is exerted on the imaging element 44 in the third frame. The image data of the third frame is the image data obtained by being captured by the imaging element 44 in a state where an anti-vibration lens (not illustrated) included in the imaging lens 40 is displaced in a direction opposite to a direction of the vibration exerted on the imaging element 44 by the optical shake correction mechanism 96. In FIG. 22, a hatched part illustrated on a right side and a lower side of the third frame image data illustrates a displacement amount of the imaging lens 40 by the optical shake correction mechanism 96.

Furthermore, in the third frame, since the input vibration information exceeds the threshold value, the comparing portion 62C3 outputs the vibration information to the vibration information embedding portion 62C1. Here, the vibration information embedding portion 62C1 performs the generation processing. The generation processing is processing of generating third frame vibration information-embedded image data by embedding the input vibration information in the third frame image data. The vibration information embedding portion 62C1 stores the third frame vibration information-embedded image data in the memory 64.

The shake correction portion 62C2 performs the shake correction processing. The shake correction processing is processing of reading out the third frame vibration information-embedded image data from the memory 64 and performing the shake correction on the third frame vibration information-embedded image data. That is, the shake correction processing is processing of correcting the shake with respect to the third frame image data based on the vibration information embedded in the third frame vibration information-embedded image data. The shake correction portion 62C2 stores third frame shake-corrected image data generated by the shake correction processing in an overwriting manner in the storage region of the third frame vibration information-embedded image data of the memory 64. Hereinafter, the first, second, and fourth frame image data and the third frame shake-corrected image data will be simply referred to as "combining image data" unless otherwise necessary to distinguish therebetween.

The image combining portion 62C4 generates the combined image data of one frame by reading out the combining image data from the memory 64 and combining the combining image data within the frame output period. The combined image data is the image data of one frame having a necessary exposure amount. Here, the combined image data is an example of "third image data" according to the embodiments of the technology of the present disclosure.

The output circuit 62D reads out the combined image data from the memory 64 and outputs the combined image data to the signal processing portion 50.

Next, an action of the imaging element 44 according to the fourth embodiment will be described. Here, combined image data generation processing executed within the frame output period by the processing circuit 62 of the imaging element 44 will be described with reference to FIG. 23A and FIG. 23B.

Figure 23A:
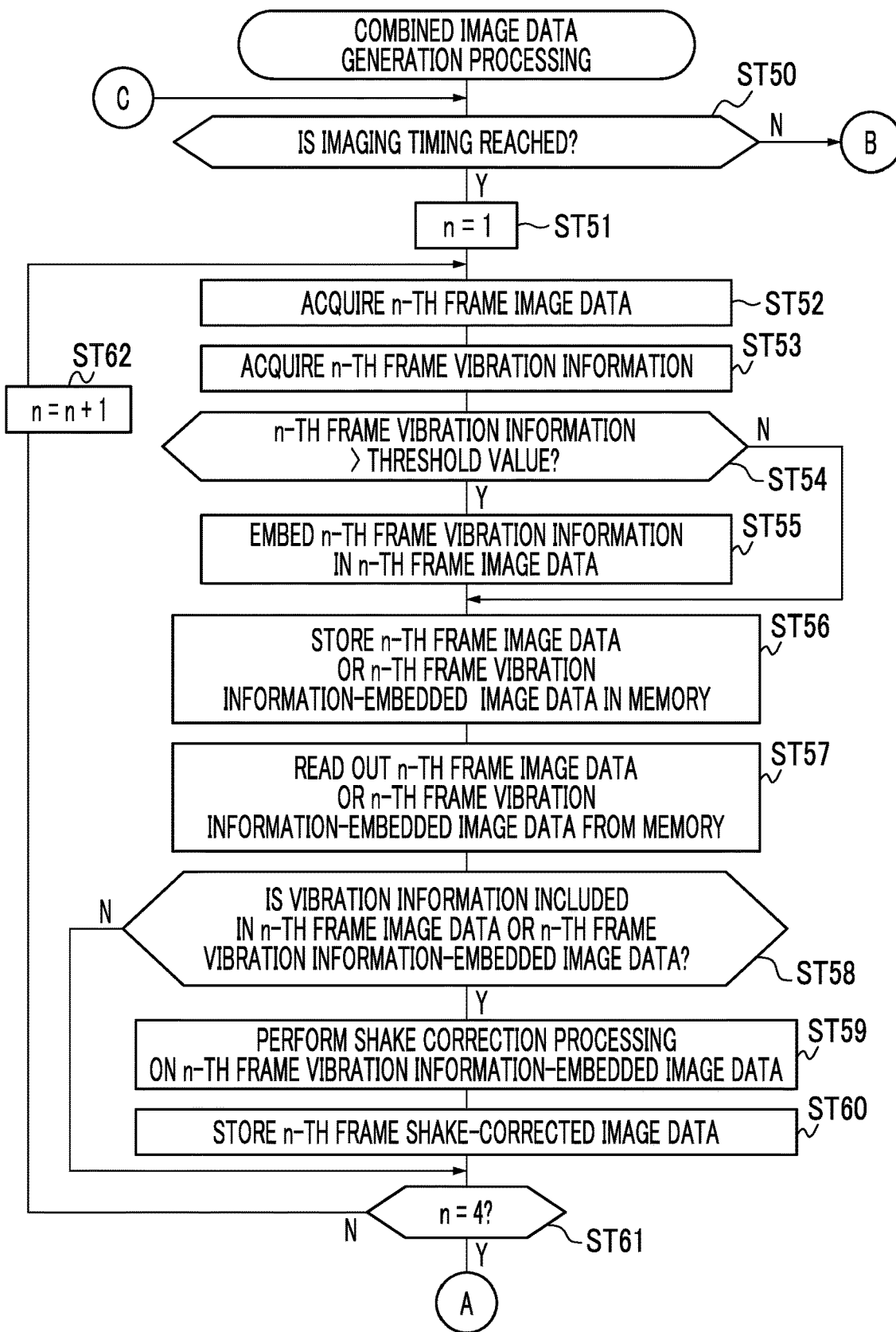
FIG. 23A is a flowchart illustrating the example of the flow of combined image data generation processing according to the fourth embodiment.
Figure 23B:
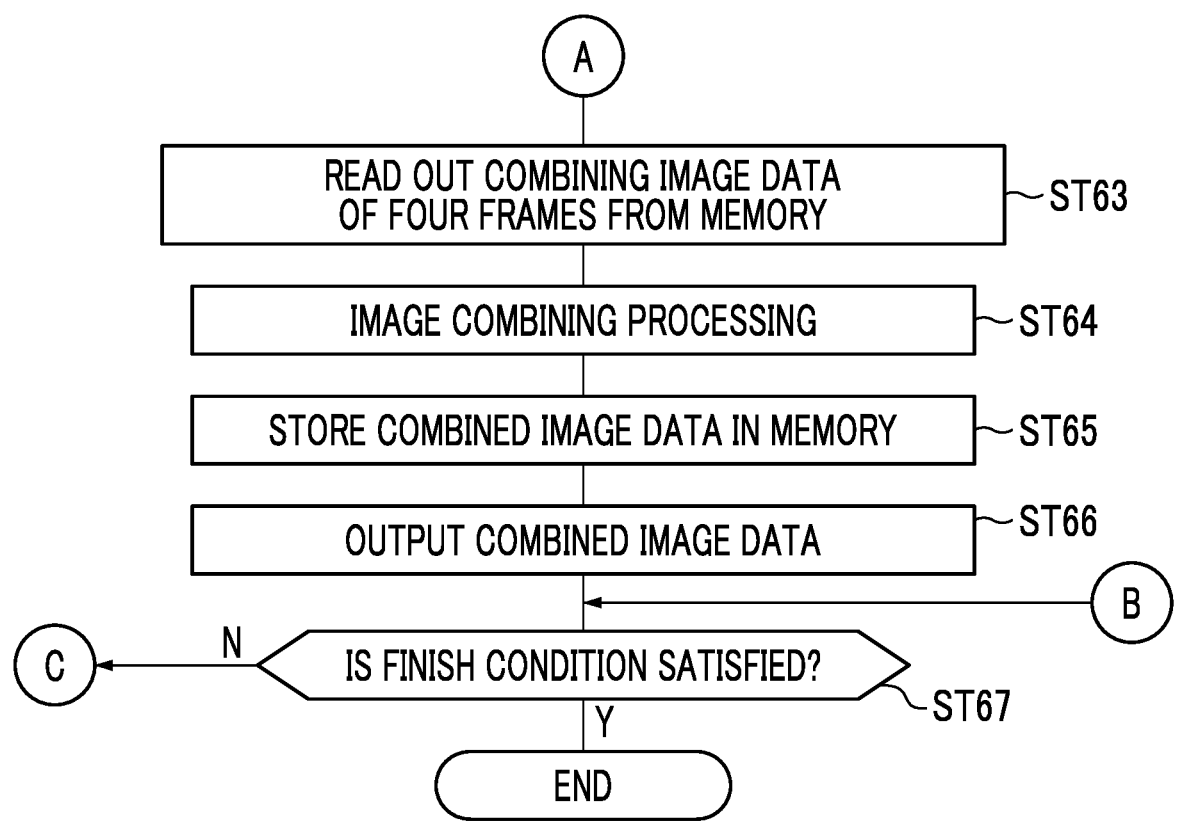
FIG. 23B is a flowchart illustrating the example of the flow of combined image data generation processing according to the fourth embodiment.

In the combined image data generation processing illustrated in FIG. 23A and FIG. 23B, first, in step ST50, the comparing portion 62C3 determines whether or not an imaging timing is reached. In step ST50, in a case where the imaging timing is not reached, a negative determination is made, and the combined image data generation processing transitions to step ST64. In step ST50, in a case where the imaging timing is reached, a positive determination is made, and the combined image data generation processing transitions to step ST51.

In step ST51, the comparing portion 62C3 sets the variable n to 1. Then, the combined image data generation processing transitions to step ST52.

In step ST52, the comparing portion 62C3 acquires the n-th frame image data by controlling the reading circuit 62A and the digital processing circuit 62B. The control circuit 62C outputs the acquired n-th frame image data to the vibration information embedding portion 62C1. Then, the combined image data generation processing transitions to step ST53.

In step ST53, the comparing portion 62C3 acquires the vibration information detected by the vibration sensor 47 during the exposure related to the n-th frame image data. Hereinafter, the vibration information detected by the vibration sensor 47 during the exposure related to the n-th frame image data will be referred to as "n-th frame vibration information". Then, the combined image data generation processing transitions to step ST54.

In step ST54, the comparing portion 62C3 determines whether or not the n-th frame vibration information is greater than the predetermined threshold value. In step ST54, in a case where the n-th frame vibration information is less than or equal to the threshold value, a negative determination is made, and the combined image data generation processing transitions to step ST56. In step ST54, in a case where the n-th frame vibration information is greater than the threshold value, a positive determination is made, and the combined image data generation processing transitions to step ST55.

In step ST55, the comparing portion 62C3 outputs the n-th frame vibration information to the vibration information embedding portion 62C1. The vibration information embedding portion 62C1 generates n-th frame vibration information-embedded image data by embedding the n-th frame vibration information in the n-th frame image data. Then, the combined image data generation processing transitions to step ST56.

In step ST56, the vibration information embedding portion 62C1 stores the n-th frame image data and the n-th frame vibration information-embedded image data in the memory 64. In step ST54, in a case where it is determined that the n-th frame vibration information is less than or equal to the threshold value, the vibration information is not embedded in the n-th frame image data. Thus, the vibration information embedding portion 62C1 stores the n-th frame image data not including the vibration information in the memory 64. Meanwhile, in step ST54, in a case where it is determined that the n-th frame vibration information exceeds the threshold value, the vibration information is embedded in the n-th frame image data in step ST55. Thus, the vibration information embedding portion 62C1 stores the n-th frame vibration information-embedded image data in the memory 64. Then, the combined image data generation processing transitions to step ST57.

In step ST57, the shake correction portion 62C2 reads out the n-th frame image data or the n-th frame vibration information-embedded image data stored in the memory 64 in step ST56 from the memory 64. Then, the combined image data generation processing transitions to step ST58.

In step ST58, the shake correction portion 62C2 determines whether or not the image data read out from the memory 64 includes the vibration information. In step ST58, in a case where the image data read out from the memory 64 is the n-th frame image data, the vibration information is not included. Thus, a negative determination is made, and the combined image data generation processing transitions to step ST61. In step ST58, in a case where the image data read out from the memory 64 is the n-th frame vibration information-embedded image data, the vibration information is included. Thus, a positive determination is made, and the combined image data generation processing transitions to step ST59.

In step ST59, the shake correction portion 62C2 performs the shake correction processing on the n-th frame vibration information-embedded image data based on the vibration information included in the n-th frame vibration information-embedded image data. Then, the combined image data generation processing transitions to step ST60.

In step ST60, the shake correction portion 62C2 stores the n-th frame shake-corrected image data generated by performing the shake correction processing in step ST59 in the memory 64. Then, the combined image data generation processing transitions to step ST61.

In step ST61, the processing circuit 62 determines whether or not the variable n is 4. In step ST61, in a case where the variable n is 4, a positive determination is made, and the combined image data generation processing transitions to step ST63. In step ST61, in a case where the variable n is not 4, a negative determination is made, and the combined image data generation processing transitions to step ST62.

In step ST62, the processing circuit 62 increases the variable n by 1. Then, the combined image data generation processing transitions to step ST52. Accordingly, processing of step ST52 to step ST60 is repeatedly executed while the variable n is changed from 1 to 4.

In step ST63, the image combining portion 62C4 reads out the combining image data of four frames from the memory 64. Then, the combined image data generation processing transitions to step ST64.

In step ST64, the image combining portion 62C4 performs image combining processing on the combining image data of four frames. Then, the combined image data generation processing transitions to step ST65.

In step ST65, the image combining portion 62C4 stores the combined image data generated in step ST64 in the memory 64. Then, the combined image data generation processing transitions to step ST66.

In step ST66, the image combining portion 62C4 reads out the combined image data from the memory 64 and outputs the read combined image data to the signal processing portion 50 through the output circuit 62D. Then, the combined image data generation processing transitions to step ST67.

In step ST67, the image combining portion 62C4 determines whether or not a condition (hereinafter, referred to as a "combined image data generation processing finish condition") under which the combined image data generation processing is finished is satisfied. For example, a condition that an instruction to finish the combined image data generation processing is received by the reception device 84 (refer to FIG. 4) is exemplified as the combined image data generation processing finish condition. In step ST67, in a case where the combined image data generation processing finish condition is not satisfied, a negative determination is made, and the combined image data generation processing transitions to step ST50. In step ST67, in a case where the combined image data generation processing finish condition is satisfied, a positive determination is made, and the combined image data generation processing is finished.

As described above, according to the imaging element 44 according to the fourth embodiment, the processing circuit 62 performs the image data processing on the digital image data captured at the high-speed imaging frame rate higher than the output frame rate. The image data processing includes the acquisition processing of acquiring the digital image data, the reception processing of receiving the vibration information, the generation processing of generating the vibration information-embedded image data by embedding the vibration information in the digital image data, and the shake correction processing of correcting the shake with respect to the vibration information-embedded image data based on the vibration information embedded in the vibration information-embedded image data. Accordingly, the image data processing including the shake correction processing can be performed on the digital image data obtained by being captured at the high-speed imaging frame rate.

In addition, according to the imaging element 44 according to the fourth embodiment, the processing circuit 62 generates the combined image data of one frame by combining the combining image data of the plurality of frames after the shake correction processing and outputs the combined image data of one frame within the frame output period. Accordingly, image data having high quality can be output, compared to a case where the combining image data of the plurality of frames is not combined.

In the fourth embodiment, while the vibration information is illustrated as continuous analog data in FIG. 22, the technology of the present disclosure is not limited thereto. The vibration sensor 47 may acquire one or a plurality of values of the vibration information in units of frames in synchronization with the exposure time period of each frame, and the comparing portion 62C3 may compare the acquired values of the vibration information with the threshold value.

In addition, in the fourth embodiment, the comparing portion 62C3 having the predetermined threshold value is comprised in the processing circuit 62, and the vibration information embedding portion 62C1 embeds the vibration information in the corresponding digital image data in a case where the comparing portion 62C3 determines that the vibration information exceeds the threshold value. However, the technology of the present disclosure is not limited thereto. As in the first embodiment, the vibration information embedding portion 62C1 may acquire the vibration information in units of frames and embed the acquired vibration information in the corresponding digital image data regardless of a magnitude of the vibration information.

In addition, in the fourth embodiment, while the threshold value is a value with respect to the angular velocity exerted on the imaging element 44, the technology of the present disclosure is not limited thereto. In a case where the acceleration, the integrated value of the angle, the integrated value of the acceleration, or the shake correction amount is employed as the vibration information, a value corresponding to each type is set as the threshold value.

In addition, in the fourth embodiment, while the optical shake correction mechanism 96 is disposed in the imaging apparatus 10, the technology of the present disclosure is not limited thereto. The optical shake correction mechanism 96 may not be disposed.

Fifth Embodiment

The imaging apparatus 10 according to the fifth embodiment comprises the same imaging element 44 as the imaging element 44 according to the first embodiment. However, the control circuit 62C of the imaging element 44 according to the fifth embodiment does not comprise the shake correction portion 62C2 (refer to FIG. 7), and the processing circuit 62 does not perform the shake correction processing based on the vibration information. The processing circuit 62 outputs the vibration information-embedded image data to the controller 46 through the signal processing portion 50 on the rear stage. Other configurations of the imaging element 44 according to the fifth embodiment are the same as the imaging element 44 according to the first embodiment and thus, will not be described.

Figure 24:
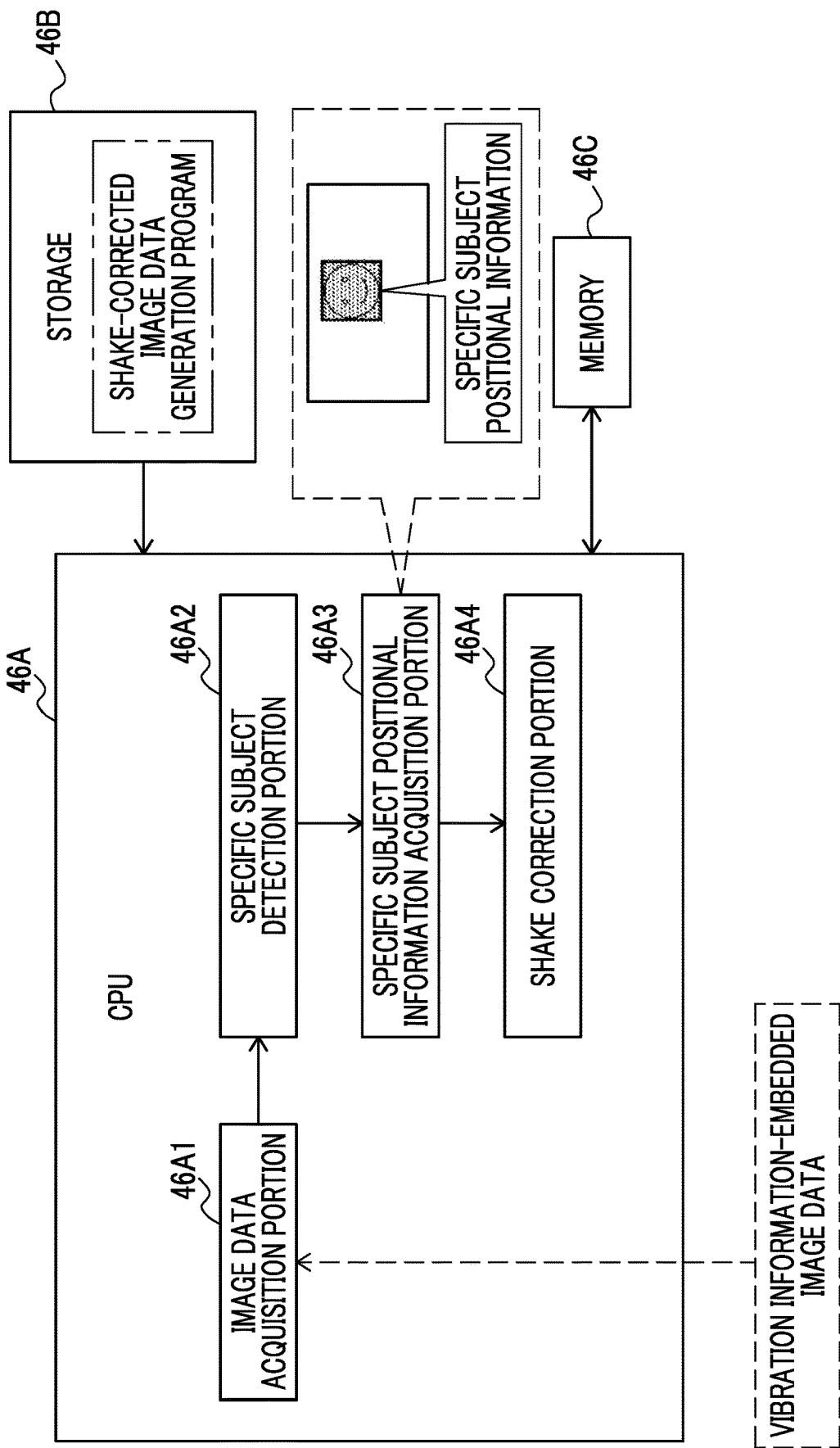
FIG. 24 is a conceptual diagram illustrating an example of an aspect in which a shake-corrected image data generation program is executed in the imaging apparatus according to the fifth embodiment.

As illustrated in FIG. 24 as an example, in the imaging apparatus 10 according to the fifth embodiment, the storage 46B stores a shake-corrected image data generation program. The CPU 46A reads out the shake-corrected image data generation program from the storage 46B and executes the read shake-corrected image data generation program on the memory 46C. The CPU 46A operates as an image data acquisition portion 46A1, a specific subject detection portion 46A2, a specific subject positional information acquisition portion 46A3, and a shake correction portion 46A4 in accordance with the shake-corrected image data generation program executed on the memory 46C. The CPU 46A executes the shake-corrected image data generation processing by operating as the image data acquisition portion 46A1, the specific subject detection portion 46A2, the specific subject positional information acquisition portion 46A3, and the shake correction portion 46A4. Here, the CPU 46A is an example of a "second processor" according to the embodiments of the technology of the present disclosure.

Figure 25:
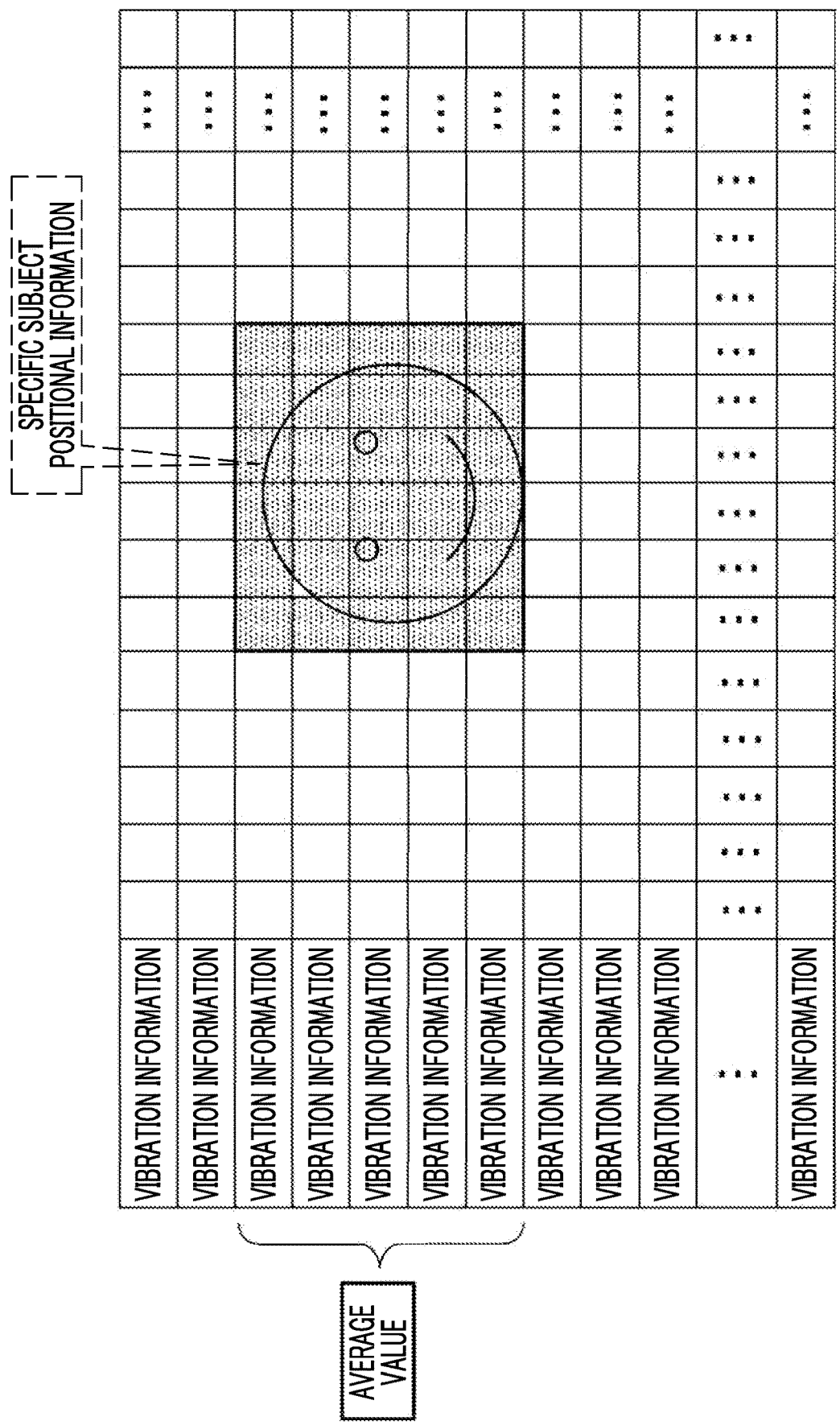
FIG. 25 is a conceptual diagram for describing a pixel line including a specific subject indicated by specific subject positional information in vibration information-embedded image data generated by the imaging element included in the imaging apparatus according to the fifth embodiment.

The image data acquisition portion 46A1 acquires the vibration information-embedded image data stored in the memory 64 of the imaging element 44 through the output circuit 62D, the signal processing portion 50, and the first communication I/F 46D1. As illustrated in FIG. 25 as an example, the vibration information-embedded image data includes the pixel line data of the plurality of lines, and the vibration information acquired within the exposure period of each pixel line is embedded in the head of the pixel line data of each of the plurality of lines. The vibration information-embedded image data and the vibration information are described in the first embodiment and thus, will not be described here.

The specific subject detection portion 46A2 detects the specific subject based on the vibration information-embedded image data. Here, pattern matching is employed as a method of detecting the specific subject. Here, the specific subject is an example of a "specific subject" according to the embodiments of the technology of the present disclosure.

The specific subject positional information acquisition portion 46A3 acquires positional information of a region including the specific subject detected by the specific subject detection portion 46A2 as specific subject positional information. In the example illustrated in FIG. 25, the face of the person is detected by the specific subject detection portion 46A2 as the specific subject, and a rectangular region surrounding the specific subject is illustrated by hatching. The specific subject positional information acquisition portion 46A3 acquires the positional information of the region illustrated by hatching as the specific subject positional information. The specific subject positional information is coordinates of two pixels on a diagonal line of the rectangular region, for example, upper left and lower right pixels. Here, the specific subject positional information is an example of "specific subject positional information" according to the embodiments of the technology of the present disclosure.

The shake correction portion 46A4 acquires the vibration information-embedded image data and the specific subject positional information and detects to which pixel line a position of the specific subject corresponds among the plurality of pixel lines based on the specific subject positional information. For example, in the example illustrated in FIG. 25, the position of the specific subject corresponds to the third pixel line to the seventh pixel line.

In this case, the shake correction portion 46A4 acquires the third to seventh pixel line vibration information embedded in the heads of the third to seventh pixel line data from the vibration information-embedded image data and calculates the average value of the third to seventh pixel line vibration information. The shake correction portion 46A4 performs the shake correction processing on the vibration information-embedded image data based on the calculated average value.

As described above, the imaging apparatus 10 according to the fifth embodiment comprises the imaging element 44 and the CPU 46A that is disposed on a rear stage of the imaging element 44 and receives an input of the vibration information-embedded image data from the imaging element 44. The vibration information-embedded image data includes the pixel line data of the plurality of lines, and the vibration information is embedded in the head of the pixel line data of each of the plurality of lines. The specific subject positional information acquisition portion 46A3 acquires the specific subject positional information indicating the position of the specific subject based on the vibration information-embedded image data. The shake correction portion 46A4 performs the shake correction processing on the vibration information-embedded image data based on the vibration information embedded in the pixel line corresponding to the specific subject positional information in the pixel line data of the plurality of lines. Accordingly, since the shake correction processing is performed by the CPU 46A of the rear stage circuit, a load of the processing circuit 62 can be reduced, compared to a case where the shake correction processing is performed by the processing circuit 62 in the imaging element 44.

In the fifth embodiment, while pattern matching is used as a method of detecting the specific subject, the technology of the present disclosure is not limited thereto. The specific subject detection portion 46A2 may detect the specific subject using a contrast of the image or machine learning.

In addition, in the fifth embodiment, while the specific subject positional information is the coordinates of two pixels on the diagonal line of the rectangular region, for example, the upper left and lower right pixels, the technology of the present disclosure is not limited thereto. The specific subject positional information may be coordinates of lower left and upper right pixels on a diagonal line of the rectangular region. In addition, the specific subject positional information may be the coordinates of the upper left pixel of the rectangular region and the number of pixels on each of two adjacent sides out of four sides of the rectangular region.

In addition, in the fifth embodiment, the specific subject positional information may be positional information of any figure that is not a rectangular shape and surrounds the specific subject, such as a circular shape or an elliptic shape. In a case where the specific subject positional information is positional information of a figure represented as a circular shape, the specific subject positional information may be information including coordinates of a pixel corresponding to a center of the circle and the number of pixels corresponding to a radius.

Figure 26:
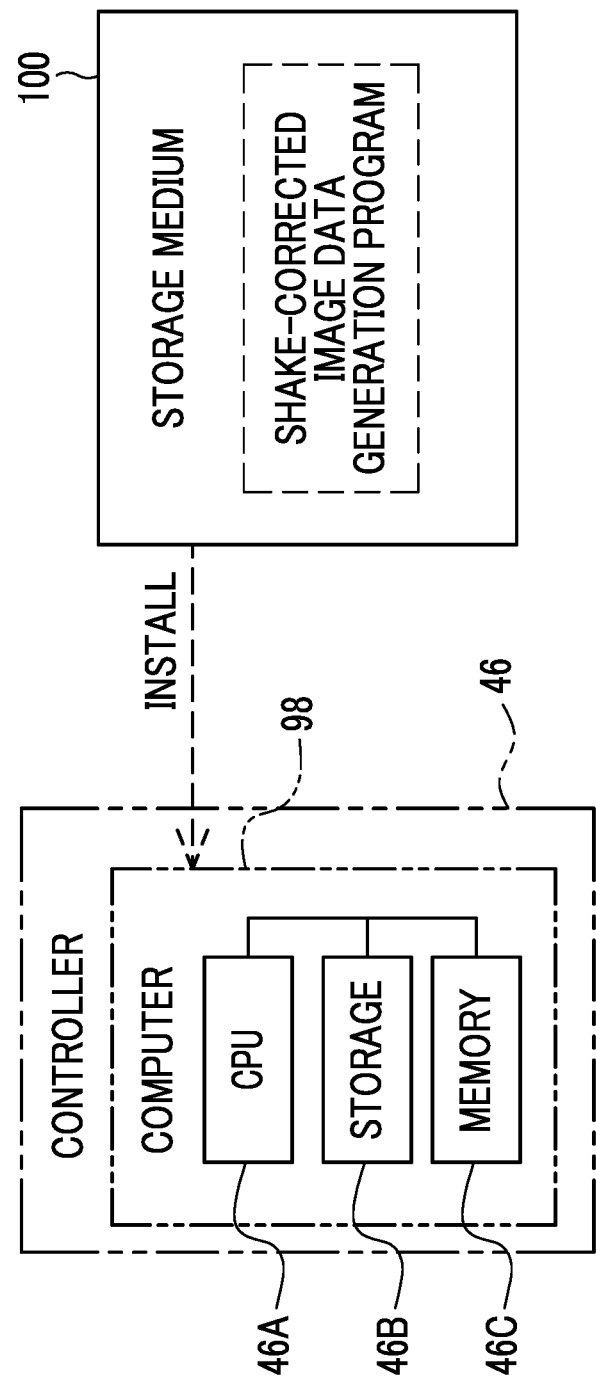
FIG. 26 is a conceptual diagram illustrating an example of an aspect in which the shake-corrected image data generation program is installed on a computer in the imaging apparatus according to the fifth embodiment from a storage medium storing the shake-corrected image data generation program.

In addition, in the fifth embodiment, while the shake-corrected image data generation program is stored in the storage 46B, the technology of the present disclosure is not limited thereto. As illustrated in FIG. 26 as an example, the shake-corrected image data generation program causing a computer 98 incorporated in the controller 46 to execute the shake-corrected image data generation processing is stored in a storage medium 100.

As illustrated in FIG. 26, the computer 98 comprises the CPU 46A, the storage 46B, and the memory 46C. The shake-corrected image data generation program stored in the storage medium 100 is installed on the computer 98. The CPU 46A executes the shake-corrected image data generation processing in accordance with the shake-corrected image data generation program.

While a single CPU is illustrated as the CPU 46A here, the technology of the present disclosure is not limited thereto. A plurality of CPUs may be employed instead of the CPU 46A. Any portable storage medium such as a flash memory card, an SSD, or a USB memory is exemplified as an example of the storage medium 100.

In addition, the shake-corrected image data generation program may be stored in a storage portion of another computer, a server apparatus, or the like connected to the computer 98 through a communication network (not illustrated), and the shake-corrected image data generation program may be downloaded to the computer 98 in response to a request from the imaging apparatus 10. In this case, the downloaded shake-corrected image data generation program executed by the CPU 46A of the computer 98.

In each of the embodiments, while a case where the vibration information is embedded in the head of the pixel line data or in the specific position of the digital image data is described, the technology of the present disclosure is not limited thereto. A method and a format of the vibration information are not particularly limited as long as the vibration information is assigned or added to the bit region set in advance in the pixel line data or the specific position of the digital image data.

In addition, in each of the embodiments, while PCI-e is illustrated as communication standards of the first communication I/F 46D1 and the second communication I/F 46D2, the technology of the present disclosure is not limited thereto. For example, the first communication I/F 46D1 and the second communication I/F 46D2 may employ other communication standards including MIPI, LVDS, SATA, or SLVS-EC. In addition, the first communication I/F 46D1 and the second communication I/F 46D2 may employ different communication standards.

In addition, while an example of a form of implementing the processing circuit 62 by the device including the ASIC and the FPGA is illustratively described in each of the embodiments, the technology of the present disclosure is not limited thereto. For example, imaging processing described above may be implemented by a software configuration using a computer.

Figure 27:
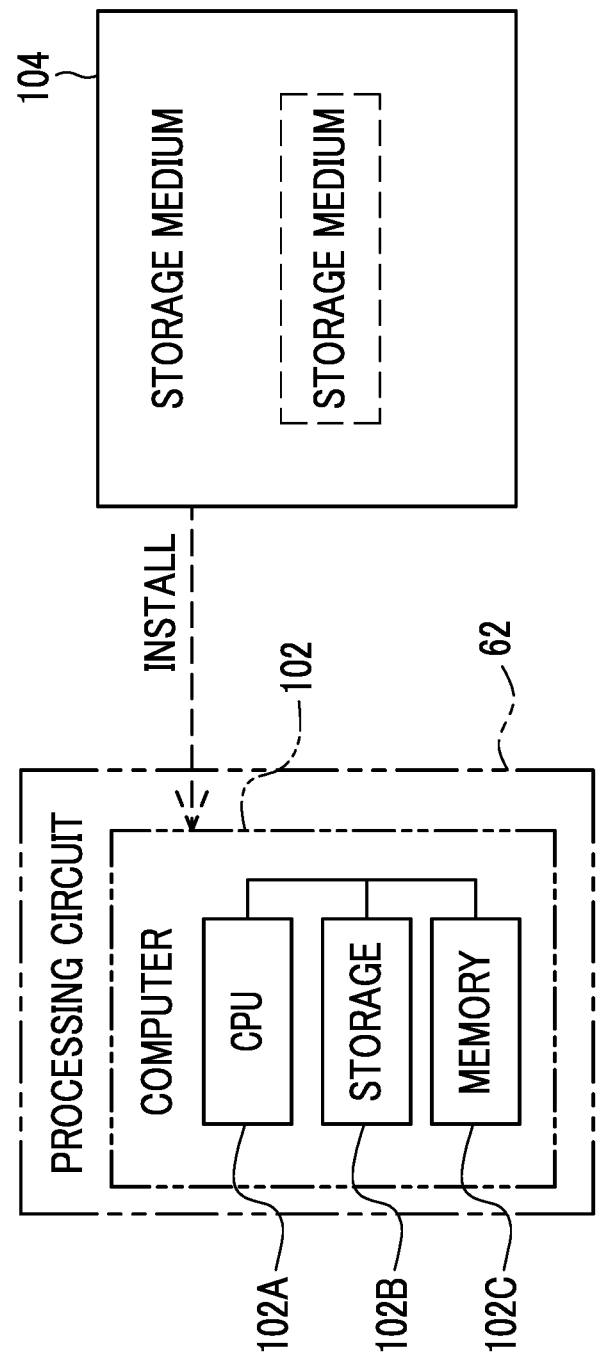
FIG. 27 is a conceptual diagram illustrating an example of an aspect in which a program is installed on a computer in the imaging element from a storage medium storing the program.

As illustrated in FIG. 27 as an example, the processing circuit 62 of the imaging element 44 incorporates a computer 102. A program for executing the shake-corrected image data generation processing and the combined image data generation processing is stored in a storage medium 104.

The computer 102 comprises a CPU 102A, a storage 102B, and a memory 102C. The program stored in the storage medium is installed on the computer 102. The CPU 102A executes the shake-corrected image data generation processing and the combined image data generation processing in accordance with the program.

The CPU 102A is not limited to a single CPU and may employ a plurality of CPUs. Any portable storage medium such as a flash memory card, an SSD, or a USB memory is exemplified as an example of the storage medium 104.

For example, the program may be stored in advance in the storage 102B instead of storing the program in the storage medium 104. The CPU 102A may read out the program from the storage 102B and execute the program on the memory 102C. In addition, the storage 102B and the memory 102C may be implemented by the same media, for example, memories.

In addition, the program may be stored in a storage portion of another computer, a server apparatus, or the like connected to the computer 102 through a communication network (not illustrated), and the program may be downloaded to the computer 102 in response to a request from the imaging apparatus 10. In this case, the downloaded program is executed by the CPU 102A of the computer 102.

In addition, the computer may be disposed on an outside of the imaging element 44. In this case, the computer may control the processing circuit 62 in accordance with the program.

The following various processors can be used as a hardware resource for executing the shake-corrected image data generation processing and the combined image data generation processing (hereinafter, referred to as "various types of processing") described in each of the embodiments. For example, as described above, a CPU that is a general-purpose processor functioning as the hardware resource for executing the various types of processing by executing software, that is, the programs, is exemplified as a processor. In addition, a dedicated electric circuit such as an FPGA, a PLD, or an ASIC that is a processor having a circuit configuration dedicatedly designed to execute a specific type of processing is exemplified as a processor.

The hardware resource for executing the various types of processing may be composed of one of those various processors or may be composed of a combination of two or more processors of the same type or different types (for example, a combination of a plurality of FPGAs or a combination of a CPU and an FPGA). In addition, the hardware resource for executing the various types of processing may be one processor.

As an example of a configuration with one processor, first, as represented by a computer such as a client and a server, a form in which one processor is composed of a combination of one or more CPUs and software, and in which this processor functions as a hardware resource for executing in-imaging apparatus processing is available. Second, as represented by an SoC or the like, a form of using a processor that implements, by one IC chip, a function of the entire system including a plurality of hardware resources for executing the various types of processing is available. In such a manner, the in-imaging apparatus processing is implemented using one or more of the various processors as the hardware resource.

Furthermore, as a hardware structure of those various processors, more specifically, an electric circuit in which circuit elements such as semiconductor elements are combined can be used.

While an interchangeable lens camera is illustrated as the imaging apparatus 10 in each of the embodiments, the technology of the present disclosure is not limited thereto.

For example, the technology of the present disclosure may be applied to a smart device. The imaging element 44 described in the embodiments is mounted in the smart device. Even with the smart device configured in such a manner, the same actions and effects as the imaging apparatus 10 described in each of the embodiments are obtained. The technology of the present disclosure can be applied to not only the smart device but also a personal computer or a wearable terminal apparatus.

In addition, the various types of processing are merely an example. Accordingly, unnecessary steps may be deleted, new steps may be added, or a processing order may be rearranged without departing from a gist of the technology of the present disclosure.

Above described contents and illustrated contents are detailed descriptions for parts according to the embodiments of the technology of the present disclosure and are merely an example of the technology of the present disclosure. For example, description related to the above configurations, functions, actions, and effects is description related to an example of configurations, functions, actions, and effects of the parts according to the embodiments of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiments of the technology of the present disclosure.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

What is claimed is:

1. An imaging element comprising:
    a memory that stores first image data obtained by being captured by the imaging element and is incorporated in the imaging element; and
    a first processor that is configured to perform image data processing on the first image data and is incorporated in the imaging element,
    wherein imaging by the imaging element is performed at a second frame rate that is higher than a first frame rate, and
    the first processor is configured to
        receive vibration information related to a vibration exerted on the imaging element within a frame output period defined by the first frame rate, and
        output second image data obtained by assigning the vibration information to a specific position set in the first image data within the frame output period.

2. The imaging element according to claim 1,
    wherein the first image data is pixel line data composed of a plurality of lines, and
    the specific position is a position set in the pixel line data of at least one line.

3. The imaging element according to claim 2,
    wherein the specific position is a position set in the pixel line data of each of the plurality of lines.

4. The imaging element according to claim 2,
    wherein the first processor is configured to
        receive partial region designation information for designating a partial region of the first image data, and
        receive the vibration information within an exposure period of a pixel line corresponding to the partial region among a plurality of pixel lines included in the imaging element, and
    the specific position is a position set in the pixel line data corresponding to the partial region.

5. The imaging element according to claim 4,
    wherein the specific position is a position set in the pixel line data for a pixel line that is exposed within a period closest to a period in which the vibration information is acquired among the plurality of pixel lines included in the imaging element.

6. The imaging element according to claim 2,
    wherein the first processor is configured to receive the vibration information within an exposure period of a center pixel line positioned at a center of the imaging element among a plurality of pixel lines included in the imaging element, and
    the specific position is a position set in the pixel line data corresponding to the center pixel line.

7. The imaging element according to claim 2,
    wherein the specific position is a head or a tail of the pixel line data.

8. The imaging element according to claim 1,
    wherein the first processor is configured to decide whether or not to assign the vibration information to the first image data in accordance with a value of the vibration information.

9. The imaging element according to claim 8,
    wherein the first processor is configured to, in a case where the vibration information exceeds a threshold value, assign the vibration information to the first image data.

10. The imaging element according to claim 1,
    wherein the vibration information is at least one of an angular velocity, an acceleration, an integrated value of an angle, an integrated value of an acceleration, or a shake correction amount.

11. The imaging element according to claim 1,
    wherein the imaging element is an imaging element in which at least a photoelectric conversion element and the memory are formed in one chip.

12. The imaging element according to claim 11,
    wherein the imaging element is a laminated imaging element in which the photoelectric conversion element and the memory are laminated.

13. The imaging element according to claim 1,
    wherein the first processor is configured to perform shake correction processing on the second image data based on the vibration information assigned to the second image data within the frame output period.

14. The imaging element according to claim 13,
wherein the first processor is configured to perform the shake correction processing using an average value, a median value, or a mode value of the vibration information.

15. The imaging element according to claim 1,
wherein the first processor is configured to perform the image data processing on the first image data captured at the second frame rate higher than the first frame rate, and
the image data processing includes
- acquisition processing of acquiring the first image data,
- reception processing of receiving the vibration information,
- generation processing of generating the second image data by assigning the vibration information to the first image data, and
- shake correction processing of correcting a shake with respect to the second image data based on the vibration information assigned to the second image data.

16. The imaging element according to claim 15,
wherein the first processor is configured to generate and output third image data of one frame by combining the second image data of a plurality of frames after the shake correction processing within the frame output period.

17. An imaging apparatus comprising:
the imaging element according to claim 1; and
a second processor that is disposed on a rear stage of the imaging element and is configured to receive an input of the second image data from the imaging element,
wherein the second image data includes pixel line data of a plurality of lines,
the vibration information is assigned to the pixel line data of each of the plurality of lines, and
the second processor is configured to
- acquire specific subject positional information indicating a position of a specific subject based on the second image data, and
- perform shake correction processing on the second image data based on the vibration information assigned to the pixel line data corresponding to the specific subject positional information in the pixel line data of the plurality of lines.

18. An operation method of an imaging element including a memory that stores first image data obtained by being captured by the imaging element and is incorporated in the imaging element, and a processor that is configured to process the first image data and is incorporated in the imaging element, the operation method comprising:
- receiving vibration information related to a vibration exerted on the imaging element within a frame output period defined by a first frame rate; and
- outputting second image data obtained by assigning the vibration information to a specific position set in the first image data within the frame output period;
wherein imaging by the imaging element is performed at a second frame rate that is higher than the first frame rate.

19. A non-transitory computer-readable storage medium storing a program executable by a computer to perform a process, the computer being applied to an imaging element including a memory that stores first image data obtained by being captured by the imaging element and is incorporated in the imaging element, and
a processor that is configured to process the first image data and is incorporated in the imaging element, the process comprising:
- receiving vibration information related to a vibration exerted on the imaging element within a frame output period defined by a first frame rate; and
- outputting second image data obtained by assigning the vibration information to a specific position set in the first image data within the frame output period;
wherein imaging by the imaging element is performed at a second frame rate that is higher than the first frame rate.

* * * * *